(12) United States Patent
Pearce et al.

(10) Patent No.: US 6,614,723 B2
(45) Date of Patent: Sep. 2, 2003

(54) ACOUSTIC SENSOR ARRAY

(75) Inventors: Richard E. Pearce, Austin, TX (US); Jonathan W. Pearce, Webster, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 09/922,947

(22) Filed: Aug. 6, 2001

(65) Prior Publication Data

US 2002/0097637 A1 Jul. 25, 2002

Related U.S. Application Data

(63) Continuation-in-part of application No. 09/635,031, filed on Aug. 4, 2000.

(51) Int. Cl.$^7$ ................................................. H04R 1/00
(52) U.S. Cl. ...................................................... 367/154
(58) Field of Search .......................... 367/154, 20, 188; 174/101.5

(56) References Cited

U.S. PATENT DOCUMENTS

| | | | |
|---|---|---|---|
| 4,075,967 A | | 2/1978 | Silvey |
| 4,510,588 A | | 4/1985 | Kruka et al. |
| 4,689,777 A | | 8/1987 | Roever |
| 4,809,243 A | | 2/1989 | Bledsoe et al. |
| 4,862,428 A | | 8/1989 | Jackett et al. |
| 4,910,715 A | | 3/1990 | Savit |
| 4,998,226 A | | 3/1991 | Henning et al. |
| 5,046,057 A | * | 9/1991 | Berni .......................... 367/170 |
| 5,089,668 A | | 2/1992 | Harvey |
| 5,136,549 A | | 8/1992 | Berglund |
| 5,141,796 A | | 8/1992 | Harvey |
| 5,251,182 A | | 10/1993 | Carpenter |
| 5,274,603 A | | 12/1993 | Zibilich, Jr. et al. |
| 5,400,298 A | | 3/1995 | Hepp |
| 5,404,340 A | | 4/1995 | Weichart et al. |
| 5,412,621 A | | 5/1995 | Hepp |
| 5,463,193 A | | 10/1995 | Carpenter et al. |
| 5,471,436 A | | 11/1995 | Harvey |
| 5,521,885 A | | 5/1996 | Harvey |
| 5,600,608 A | | 2/1997 | Weiss et al. |
| 5,796,676 A | | 8/1998 | Chang et al. |
| 5,798,488 A | | 8/1998 | Beresford et al. |
| 5,867,451 A | | 2/1999 | Chang et al. |
| 6,151,277 A | | 11/2000 | Erath et al. |
| 6,154,420 A | | 11/2000 | Norris |
| 6,188,646 B1 | | 2/2001 | Luscombe et al. |
| 6,262,944 B1 | * | 7/2001 | Meyer et al. ................ 367/154 |
| 6,292,436 B1 | | 9/2001 | Rau et al. |

FOREIGN PATENT DOCUMENTS

WO     WO0212922     2/2002

* cited by examiner

*Primary Examiner*—Daniel T. Pihulic
(74) *Attorney, Agent, or Firm*—Madan, Mossman & Sriram, P.C.

(57) ABSTRACT

An acoustic sensor array may include sensor sections positioned along a length of a strain member. One or more sensors may be disposed within a sensor section. One or more sensors may be encapsulated in a molding material using a reaction injection molding (RIM) process to form a sensor section. Buoyant sections may be formed between sensor sections on the strain member. Buoyant sections may be formed by encapsulating a portion of the strain member in a buoyant molding material using a RIM process. Buoyant sections and/or sensor sections may include hollow microspheres. A concentration of hollow microspheres may be adjusted to control a buoyancy of the array. The strain member, the sensor sections, and the buoyant sections may be joined to form the array.

111 Claims, 14 Drawing Sheets

ACOUSTIC SENSOR ARRAY

PRIORITY CLAIM

This application is a continuation-in-part of U.S. patent application Ser. No. 09/635,031 which was filed on Aug. 4, 2000. The above-referenced application is incorporated by reference as if fully set forth herein.

BACKGROUND OF THE INVENTION

1. Field of the Invention

The present invention relates generally to acoustic sensors. An embodiment relates to an acoustic sensor array that has high sensitivity, a robust response, and a desired and substantially uniform buoyancy.

2. Description of Related Art

Acoustic sensors may be used to measure sound transmitted through water. One type of acoustic sensor is a hydrophone. A number of hydrophones may be coupled together to form an acoustic sensor array. Acoustic sensor arrays may be used as detection instruments to monitor vessel movement in a marine environment. Acoustic sensor arrays may be used during seismic surveys of water covered areas to estimate the location of underground formations and structures. Acoustic sensor arrays may be placed in liquid filled wellbores. Such acoustic sensor arrays may be used to conduct vertical seismic surveys. Acoustic sensor arrays may be used as sensors for a variety of other applications as well.

One type of acoustic sensor array is a liquid filled array. The acoustic sensor array, which may be over 8 kilometers in length, may include a number of active cable sections. Each active cable section may include several groups of hydrophones connected in series. The hydrophones may be placed within a flexible, sealed tubular outer jacket that is made of polyurethane or a similar material. Multiple strain members (generally between two and five) may be axially spaced apart along the length of the array within the outer jacket. The strain members may be cables; such as, but not limited to, steel cables, cables reinforced with high-strength polymers such as KEVLAR and/or cables formed of high-strength polymers such as VECTRAN. The strain members may bear the load of the array when the array is towed or otherwise supported. The array may be filled with a nonconductive, light fluid, such as kerosene, to provide the array with a desired buoyancy.

Liquid filled arrays may have several characteristics that are undesirable. The arrays may be difficult and labor intensive to construct. The arrays may have to be stored on reels that have large diameters (greater than 10 feet) to inhibit damage to the array. The arrays may have inherent sensitivity limitations due to noise generated within the array by the fluid during use. The arrays may need to be towed at depths from about 12 to 30 feet below water surface to minimize surface reflection noise and surface wave noise. The arrays may present significant safety, health and environmental problems should the outer casing leak or rupture.

A second type of acoustic sensor array is a solid or non-liquid filled acoustic sensor array. U.S. Pat. Nos. 6,108,274; 6,108,267; 5,982,708; 5,883,857; 5,774,423; 5,361,240; and 4,733,378, each of which is incorporated by reference as if fully set forth herein, describe non-liquid filled arrays and hydrophones for non-liquid filled arrays. Non-liquid filled arrays may be easier to manufacture, may be used at shallower depths and may have hydrophone responses that are more sensitive and robust than the response obtainable from a liquid filled array.

A hydrophone may produce electrical signals in response to variation of acoustic wave pressure across the hydrophone. Several hydrophones may be electrically coupled together to form an active section of an acoustic sensor array. There may be several separate active sections within an acoustic sensor array. Electrical signals from multiple hydrophones of an active section may be combined to provide an average signal response and/or to increase the signal-to-noise ratio within an active section of the array. Hydrophones may be coupled together in serial and/or parallel arrangements so that active sections of the array have a desired response and sensitivity to acoustic waves. Typically, fewer hydrophones are needed in an active section of the array if the individual hydrophones have a high signal-to-noise ratio. The use of hydrophones having high signal-to-noise ratios allows for shorter, sensitive and robust acoustic sensor arrays. Hydrophones of non-liquid filled arrays may have an increased signal-to-noise ratio as compared to typical hydrophones of liquid filled arrays.

One type of non-liquid filled acoustic sensor array is a "floatation" cable design. The design includes a buoyant material, such as foamed polyethylene, that is formed over an inner jacket. The buoyant material is then covered with a polyurethane outer jacket. The types of material used for a floatation cable design may not allow the buoyant material to bind to the outer jacket or the inner jacket. If the outer casing were to be ruptured during use, water that entered into the array would undesirably be able to migrate up and down the length of the cable.

SUMMARY OF THE INVENTION

An acoustic sensor array may include a strain member, sensor sections and buoyancy sections. The sensor sections and the buoyancy sections may alternate along a length of the strain member. The sensor sections may be placed along a length of the strain member. Each sensor section may include one or more sensors capable of detecting acoustic signals. The sensors may be electronic sensors or fiber optic sensors. A potting material may be used to fill the space between a body of the sensor sections and the strain member. Buoyancy sections may be formed between adjacent sensor sections. The buoyancy sections may be formed of material that provides a desired amount of buoyancy for the array. When the buoyant sections are formed, the material of the buoyant sections may bind to the sensor sections. The material may also bind to the strain member. Filling the space between the strain members and the bodies of the sensors with potting material, and binding the buoyant sections to the sensor sections makes the array substantially an integral, solid unit. If one of the sections were to crack, migration of fluid in the array would be inhibited beyond the extent of the crack. In addition, the material used to form outer portions of the array may be made of a polymer material, such as polyurethane, that is resistant to cracking and/or breakage during use.

A sensor of a sensor section may be encapsulated within a polymer body. In an embodiment, the polymer is a polyurethane. To form a sensor section, positioners may hold a sensor at a desired position within a mold. Wiring for the sensors may be spiral wound about one, or both, of the positioners. Spiral winding the wiring may inhibit strain damage to the sensors due to bending of the array during use or during storage on a reel. The positioners may be made of, or coated with, a material that does not bind to the polymer so that the positioners may be removed after encapsulation of the sensor. The polymer is injected into the mold to form the sensor section. The mold may be part of a reaction injection molding machine. The polymer may be a material that is capable of binding to the material used to form buoyancy sections of a sensor array. The sensor sections may be formed so that the ends of the sensor sections have large surface areas that will bind to ends of buoyancy sections. A binding film may be wrapped on the ends of the sensor sections, and/or a binding fluid may be placed on the ends of the sensor sections, to enhance binding between the sensor sections and the buoyancy sections.

A sensor of a sensor section may be a hydrophone. The hydrophone may include a base that forms a back plane for a sensor. The base may have a number of ridges that form a plurality of concave surfaces in an outer surface of the base. In an embodiment, the base may have eight ridges so that the back plane has a generally octagonal cross sectional shape with eight concavely curved sides. Other back planes may have cross sectional shapes having fewer or more than 8 sides. A back plane may be molded or placed on the base, or the back plane may be an integral part of the base. A flexible diaphragm may slide over the back plane. In an embodiment, the diaphragm may have a cross sectional shape that substantially matches the cross sectional shape of the back plane yet allows air gaps to form between the concave sides and the diaphragm. In other embodiments, the diaphragm may have a different cross sectional shape than the back plane. For example, in an embodiment, the back plane has a generally octagonal outer cross sectional shape with concave curved sides and the diaphragm has a circular cross sectional shape. A sealant may be placed between the diaphragm and the back plane at both ends of the diaphragm. During use, the diaphragm is able to flex into the concavities of the back plane in response to acoustic waves that pass through the hydrophone.

A thin piezoelectric film may be wrapped around the diaphragm. The piezoelectric film may be made of polyvinylidiene fluoride. The film may include a conductive pattern. In an embodiment, the pattern is formed of a conductive ink. In other embodiments, the pattern may be formed by other techniques, such as etching. In certain embodiments, the pattern may include a number of conductive sections that are separated by voids. The voids may be positioned above the ridges of the back plane when the film is wrapped around the diaphragm and glued, taped, or otherwise sealed to the diaphragm during assembly. Small conductive traces may connect conductive sections across the voids. When an acoustic wave passes through the sensor, the wave deflects the piezoelectric film, and the film generates an electrical signal that is transmitted through the conductive pattern. Limited travel distance between the diaphragm and a concave surface of a back plane may inhibit stretching of the piezoelectric film beyond a yield limit of the film. Having only small conductive traces located at the ridges may reduce passive capacitance contributions from ridge supported portions of the piezoelectric film. A dielectric film having an outer metallic coating may be placed around the piezoelectric film as an electromagnetic shield.

The encapsulated sensors may be formed and individually tested for operational performance before being joined together in an acoustic sensor array. A strain member may be threaded through a passage within each of the encapsulated sensors. The sensors may be spaced at desired positions along a length of the strain member. Wiring of the sensors may be spiral wound around the strain member. In an embodiment, the wiring is spiral wound around the strain member in the same orientation as the winding within the encapsulated sensors. Active sections may be formed by coupling several sensors together in series and/or parallel configurations. Signal amplifiers may be coupled to the wiring where needed. The wiring of the sensors may be electrically coupled to channels in or on the strain member. In an embodiment, the sensors of an active section are connected together and there is only a single entry into a channel within the strain member regardless of the number of sensors that make up the active section. In an embodiment, the strain member includes 24 separate channels. Each active section may be tested to ensure that the active sections operate within desired parameters. For each sensor, an end of the sensor may be plugged and the space between the encapsulated sensor and the strain member may be filled with a potting material. The potting material may include filler material, such as hollow glass beads. The filler material may help establish desired buoyancy within the sensor section. The potting material may be configured to bind to a coating of the strain member and/or to the polymer material of the body of the sensor section.

Buoyancy sections may be formed between adjacent sensor sections. The sensor sections may be placed at each end of a mold. The mold may be closed and polymer may be shot or produced within the mold to form a buoyancy section between the sensor sections. In an embodiment, the mold is part of a reaction injection molding machine. In an embodiment, the mold produces buoyancy sections that have substantially the same outer circumference or perimeter that the sensor sections have. In other embodiments, the mold produces buoyancy sections that have larger or smaller outer circumferences or perimeters than the sensor sections. The larger or smaller outer circumferences may taper to the same circumference or perimeter as the sensor sections. The material used to form the buoyancy sections, which may be a polyurethane, binds to the ends of the sensors. A film or a coating may be placed on the ends of the sensor sections and/or the buoyancy sections to promote binding of the sensor sections to the buoyancy sections. The strain member may include a coating, such as a polyurethane coating, that binds with the material of the buoyancy section when the buoyancy section is formed.

The material used to form the buoyancy sections may include filler that allows the material to have a desired buoyancy. In an embodiment, the filler is hollow glass beads. The size of the hollow glass beads and the concentration of the glass beads may be adjusted so that the array has a desired overall density. Buoyancy variations in buoyancy sections of a sensor array may be desired along a length of the array to counter the effect of sections of the array that are more dense than other sections. For example, ends of an array and sections that include telemetry units may be more dense than other sections of the array. The amount and/or size of hollow beads in the material used to form the buoyancy sections adjacent to the ends and adjacent to telemetry units may be adjusted to accommodate the greater density of these sections so that the array has a desired overall buoyancy. The material used to form the buoyancy sections may be adjusted so that the array will have a substantially uniform buoyancy along a length of the array.

An advantage of a sensor array made of sensor sections, buoyancy sections and a strain member is that the materials used to form the array may have desirable properties and characteristics. For example, the primary material used to form an outermost layer of the array may be a polyurethane material that provides high resistance to physical damage to the array while still allowing the array to be flexible. The material used to form the buoyancy sections may include filler material that allows the buoyancy of the array to be controlled. The material used to encapsulate sensors within sensor sections of the array may not include filler material if the filler material will decrease an energy of acoustic waves passing through the material to the sensors.

An advantage of a sensor array made of sensor sections, buoyancy sections and a strain member is that the array may have a small outer diameter and a short length as compared to typical liquid filled arrays. Liquid filled arrays typically had to be wound on reels having diameters that were greater than 10 feet. An array formed of buoyancy and sensor sections may have a small diameter and may be stored on reels having small diameters. For example, an array may be formed that has an outer diameter of about 1½ inches. Such an array may be stored on a reel having a diameter as small as about 1½ feet. Sensors within solid arrays may be more sensitive than sensors within liquid filled arrays. The increased sensitivity may allow for more accurate detection of acoustic signals, and may allow for the use of arrays that are shorter than would be practical if a liquid filled array were used. The use of shorter arrays having small outer diameters allows the arrays to be stored in less space and allows the arrays to be lighter and easier to manipulate.

An advantage of a sensor array made of sensor sections, buoyancy sections and a strain member is that the sensor sections and the buoyancy sections may bind together during formation of the array. Passages through the sensor sections may be filled with potting material to seal the sensor sections to the strain member. Binding the sensor sections to the buoyancy sections and sealing the sensor sections to the strain member may inhibit fluid migration within the array should the array become cracked or damaged.

An advantage of a sensor array is that signals generated by sensors may be conveyed through electrical channels within a strain member of the array. Several sensors may be electrically coupled together to form an active section of an array. In an embodiment, each individual sensor may be coupled to a channel within the strain member. In an alternate embodiment, a group of sensors may be electrically coupled together and the group may be coupled to a channel of the sensor. Several groups may be coupled to one channel, or only one group may be coupled to one channel. Coupling only one group to a channel of the sensor array allows for a minimal number of entries into the strain member to accommodate all of the sensors of the sensor array.

An advantage of a sensor array made of sensor sections, buoyancy sections and a strain member is that controlling the material used to form the buoyancy sections may control the buoyancy of the array. In certain embodiments the material used to form the buoyancy sections may include filler. The filler may be a material, such as hollow glass beads, having a selected size and concentration that will result in the formation of buoyancy sections having a desired buoyancy. The filler material may be altered in various parts of the array to produce buoyancy sections that will accommodate different densities of the array at different locations along a length of the array. Space between the strain member and the sensor sections may be filled with a potting material during formation to couple the sensor sections to the strain member. The potting material may include filler material, such as hollow glass beads, to increase the buoyancy of the sensor sections of the array. Further advantages may include that the sensor array is strong, sturdy, durable, lightweight, flexible, simple, efficient, safe, reliable and inexpensive; yet the sensor array may also be easy to manufacture, handle and use.

BRIEF DESCRIPTION OF THE DRAWINGS

Further advantages of the present invention may become apparent to those skilled in the art with the benefit of the following description of the preferred embodiments and upon reference to the accompanying drawings in which.

Figure 1:
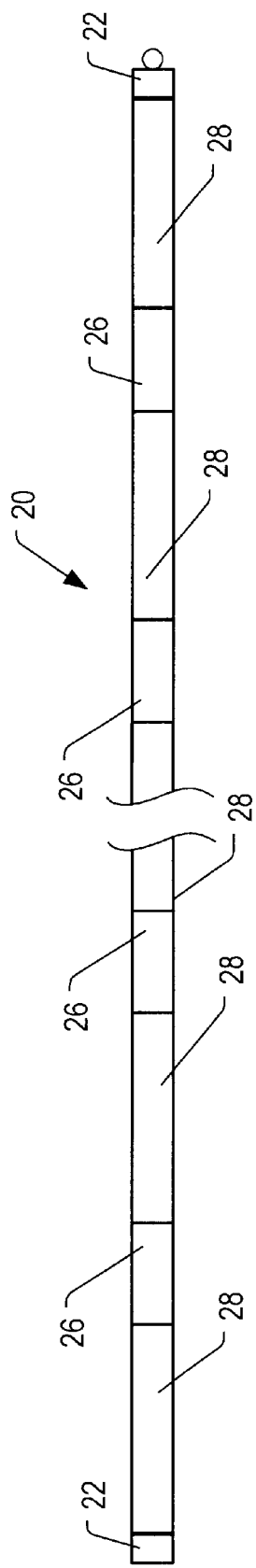
FIG. 1 depicts an embodiment of a sensor array.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 depicts a representation of a sensor array 20. The array 20 may be used for various purposes including, but not limited to, geological surveying of formations beneath a body of water, detection and surveillance of acoustic sources in a marine environment, and geological surveying of formations adjacent to an array positioned within a wellbore filled with fluid.

An array 20 may include ends 22, strain member 24 (shown in FIG. 2), sensor sections 26, and buoyancy sections 28. Ends 22 of the array 20 may be metallic connectors such as, but not limited to rings, threading, or quick releases. Typically, ends 22 are coupled to the strain member and to buoyancy sections 28; though an end, or the ends, may be coupled to sensor sections 26, if desired. The types of ends 22 at each end of an array 20 may be different. The ends 22 may allow the array 20 to be maneuvered, handled, and coupled to an external support and/or instrumentation. At least one end of the array 20 may include a connector that allows the array to be coupled to a device that records and/or processes signals from the array. The connector may be an electrical and/or fiber optic connector.

Buoyancy sections 28 and outer bodies of sensor sections 26 may be formed by molding processes. In embodiments, bodies of sensor sections 26 and buoyancy sections 28 are formed by reaction injection molding (RIM) processes. Buoyancy sections 28 and sensor sections 26 may have hollow microspheres 27 (shown in FIG. 2). Other processes may also be used to form sensor sections and buoyancy sections. Such processes may include, but are not limited to, injection molding and use of thermosetting materials. RIM processes may advantageously be more economical and less labor intensive than other processes that may be used to form sensor sections and/or buoyancy sections.

Figure 3:
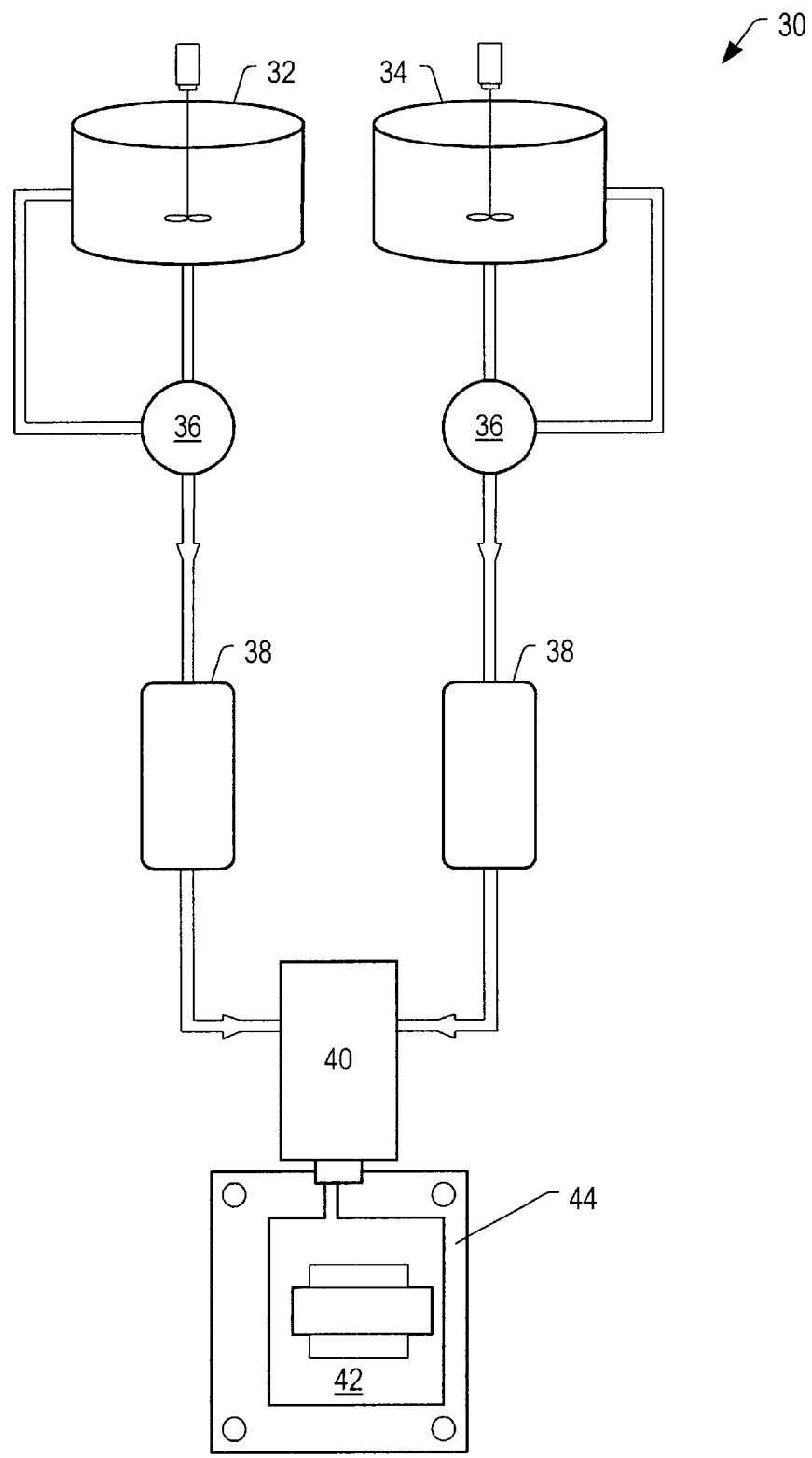
FIG. 3 depicts a representation of a reaction injection molding system.

FIG. 3 depicts a schematic of an embodiment of RIM system 30. A typical RIM system may be a SURE SHOT 150 obtained from Hi-Tech Engineering (Grand Rapids, Mich.). A RIM system 30 may include first feed tank 32 and second feed tank 34. The first tank 32 may hold a first component that is used to form a polymer during the RIM process. The first component may be a polyol. The first component may include alcohol-terminated polyethers and polyesters. Examples of alcohol-terminated polyethers include polyethylene oxide and polypropylene oxide. An example of an alcohol-terminated polyester is poly-1,4-butylene adipate. In some embodiments, the first component may include dialcohols. Examples of dialcohols include ethylene glycol, diethylene glycol, 1,4-butanediol, and 1,6-hexanediol. The first tank 32 may include a mixer that stirs fluid within the tank.

In some embodiments of a first component, an additive may be added to the first component. The additive may be a polymerization initiator, or the additive may control physical and/or chemical properties of a polymer formed by a RIM process. For example, hollow microspheres may be added to the first component. The hollow microspheres may be added to control the density and/or buoyancy of the material produced by the RIM process. Different concentrations and/or sizes of hollow microspheres may be incorporated into different sections of a sensor array. In an embodiment, hollow glass microspheres are added to buoyancy sections of the array so that the entire array has substantially neutral buoyancy in fresh water. If an array is neutrally buoyant in fresh water, the array will be positively buoyant in saline water. Weight may be added to the array during use in saline water so that the array has neutral buoyancy in the saline water. It is significantly easier to add weight to an array to make it less buoyant than it is to increase the buoyancy of an existing array. In other embodiments, the concentration and/or size of the hollow microspheres in an array is controlled so that the array will be substantially neutrally buoyant in a fluid other than fresh water.

Hollow microspheres added to a first component may be subjected to high shear forces during mixing and injection into a mold. The hollow microspheres may have high strength properties that inhibit breakdown of the microspheres during a RIM process. The microspheres may be small enough to have negligible acoustic energy dissipation effect on acoustic waves passing through a sensor array. This allows the use of hollow microspheres in material that forms sensor bodies of sensor sections of the array. The hollow microspheres may be made of glass or other material. The hollow microspheres may have densities that may be adjusted for a desired buoyancy. For example, a density of hollow microspheres may be between about 0.1 g/cm3 and about 0.9 g/cm3. In some embodiments, the hollow microspheres may have a density of about 0.38 g/cm3. In an embodiment, the hollow microspheres are S-38 SCOTCHLITE from 3M (St. Paul, Minn.). The hollow microspheres may be high strength microspheres. In some embodiments of sensor arrays, sensor bodies may be formed without microspheres.

A second feed tank 34 may hold a second component that is mixed with a first component to form a polymer during a RIM process. The second component may be isocyanate. The isocyanate may be, but is not limited to, toluene diisocyanate (TDI), methylene-4,4'-diphenyl diisocyanate (MDI), and polymeric isocyanate (PMDI) or mixtures thereof. In some embodiments of a RIM process, additives may be added to the second component as a polymerization initiator or to control chemical and/or physical properties of a polymer produced by the RIM process. The second feed tank 34 may include a mixer that stirs fluid within the tank.

Circulation pumps 36 may direct fluids in first feed tank 32 and second feed tank 34 to metering pumps 38. When fluid is not directed to the metering pumps 38, the circulation pumps 36 may circulate fluid in the first feed tank 32 back to the first feed tank and fluid in the second feed tank 34 back to the second feed tank. The circulation pumps 36 may be low pressure pumps.

An additive may be introduced into the first feed tank 32 or the second feed tank 34 through entry ports in the tanks. Certain additives may tend to float on a top surface of fluid within a tank. Piping leading from a circulation pump 36 to a tank may discharge recirculated fluid above the top surface of fluid in the tank. The recirculated fluid may wet the additive and force the additive into the fluid in the tank. Alternately, the additive may be added to piping that enters or leaves the tanks.

Metering pumps 38 may control amounts of first component and second component that are sent to mixer 40. After mixing, the combined fluid is directed to mold 42 within molding machine 44. After the mold 42 is filled, excess mixed fluid may be discharged from piping leading from the mixer 40 to the mold. The combined fluid is a reactive mixture that forms a polymer within the mold 42. The combined fluid may flow relatively easily for a short period of time. If the first component is a polyol and the second component is an isocyanate, the combined fluid will produce a polyurethane.

After combined fluid has resided in a mold 42 for a sufficient time to allow the fluid to form into polymer (typically less than 3 minutes), the mold may be opened so that the formed product can be removed from the mold. A molding machine 44 may be used to form sensor sections by encapsulating sensors within sensor bodies. The mold machine 44 may form one or more sensor sections in one RIM cycle. The sensor sections may be tested, placed on a strain member, fixed at a desired location on the strain member and electrically coupled together to form active sections of an array. The molding machine 44 may subsequently be used to form buoyancy sections of a sensor array.

Buoyancy sections of an array may be formed using a molding machine 44. A mold 42 and the molding machine 44 may be the same mold and molding machine used to form sensor sections. Sensor sections and portions of strain member between the sensor sections may be placed in the mold 42 of the mold machine 44. If a first or last section of an array is to be formed, an end connector may be positioned at an end of the mold. The RIM system 30 may be cycled to form a buoyancy section over a portion of the strain member and between adjacent sensor sections, or between an end connector and a sensor section. The same material used to form the sensor sections may be used to form the buoyancy sections. The material used to form the buoyancy sections may include a buoyancy additive or filler, such as hollow microspheres. One or more buoyancy sections may be formed in one cycle of the RIM system. The mold may be opened, the formed section of cable may be removed from the mold, the strain member may be advanced to place sensor sections without buoyancy sections in the mold, and the process may be repeated until all buoyancy sections of the array are formed. End connectors may be molded to buoyancy sections at each end of an array.

Buoyancy variations in buoyancy sections of a sensor array may be desired along a length of the array to counter the effect of sections of the array that are more dense than other sections. For example, ends of an array and sections that include telemetry units may be more dense than other sections of the array. The amount and/or size of hollow beads in the material used to form the buoyancy sections adjacent to the ends and adjacent to telemetry units may be adjusted to accommodate the greater density of these sections so that the array has a desired overall buoyancy.

In some embodiments of sensor arrays, an outer surface shape of sensor sections is different than the shape of the outer surface of buoyancy sections. Different outer surface shapes of sensor sections and buoyancy sections may require the use of different molds to form the sensor sections and buoyancy sections.

Figure 20:
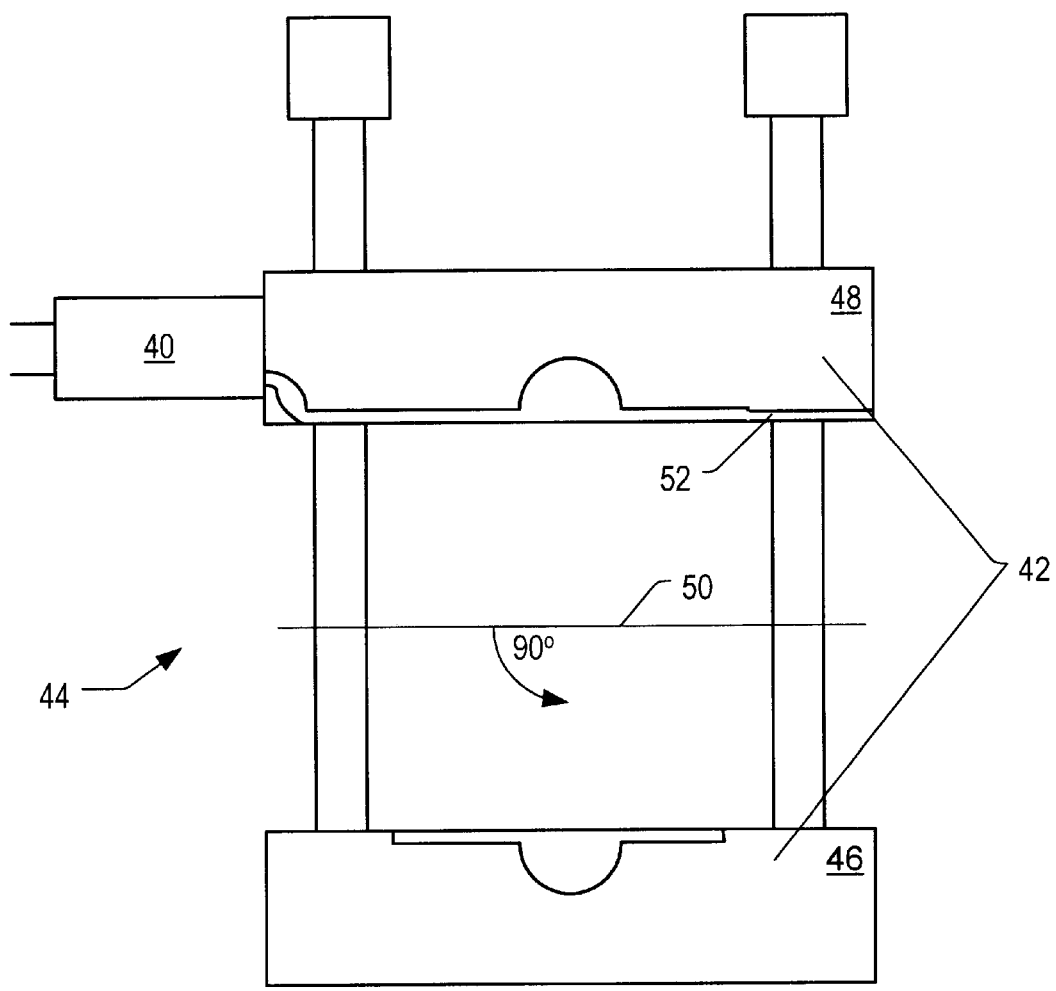
FIG. 20 illustrates a cross sectional view of a molding machine.

FIG. 20 illustrates a cross sectional view of a molding machine 44. A mold 42 for forming sensor sections and/or buoyancy sections may be a two piece mold. First mold piece 46 may be attached to a first portion of a molding machine 44, and second mold piece 48 may be attached to a second portion of the molding machine. The molding machine 44 may be closed so that the first mold piece 46 and the second mold piece 48 form a mold chamber. When a sensor section or buoyancy section is formed, mandrels or other positioners placed within the mold chamber may properly position or define features of the product being produced in the mold.

A first mold piece 46 may include a base with a half cylinder indentation running along a length of the base. A second mold piece 48 may include a base with a half cylinder indentation that mates to the half cylinder of the first mold piece 46. The second mold piece 48 may include fluid injection guides that distribute fluid evenly into a mold 42 formed by the first mold piece 46 and the second mold piece. The second mold piece 48 may also include vents 52 that allow air to be displaced from the mold as fluid is injected into the mold. The mold 42 may include heater elements that heat surfaces of the mold to temperatures that inhibit fluid from a mixer 40 from condensing on surfaces of the mold as fluid is injected into the mold. Mold release compound may be placed on the surfaces of the mold 42 so that a formed product may be removed from the mold when the mold is opened.

A molding machine 44 may rotate a closed mold approximately 90° prior to mold material being injected into the mold 42. In an initial position, an interface 50 between a first mold piece 46 and second mold piece 48 may be substantially parallel to the ground. This orientation facilitates positioning of items within the mold 42 when the mold is open. After the mold 42 is closed, the mold may be rotated about 90° about a center of the mold chamber so that the interface 50 is oriented substantially perpendicular to the ground. Mold material may be injected into the mold chamber so that material flows in an upward direction. The perpendicular orientation of the interface 50 aligns fluid guides and vents of the mold in a vertical orientation that may promote uniform flow of material into the mold chamber.

A diameter of a cylinder formed by half cylindrical indentations of a first mold piece 46 and a second mold piece 48 will typically be the outer diameter of a product formed by the mold 42. Molds may be formed that produce bodies with shapes other than cylindrical shapes. For example, molds may be formed that produce bodies having hexagonal, octagonal, or other cross sections. Molds may be produced that produce bodies having diameters that vary along a length of the product. For example, a mold may produce a product that has a largest diameter at a center of the product, and the diameter may taper towards each end of the product.

Figure 2:
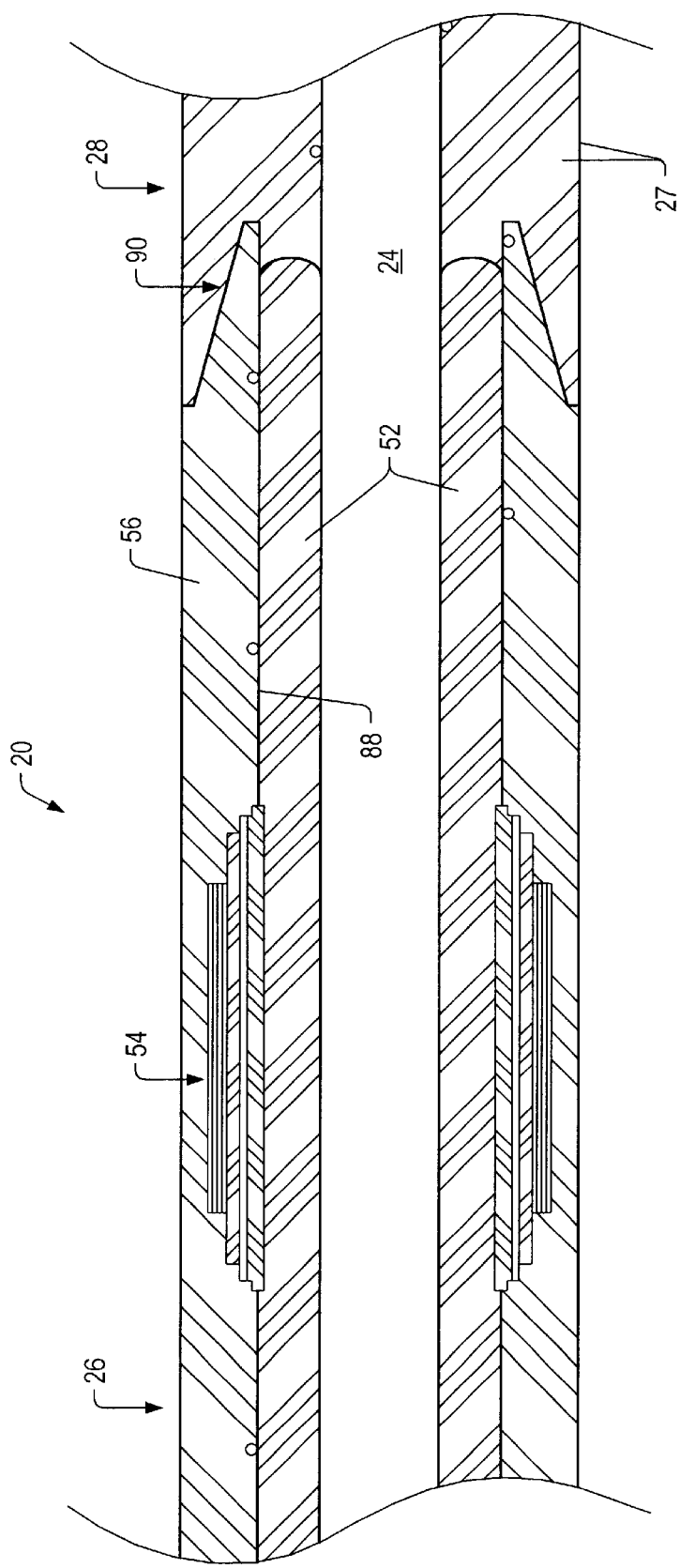
FIG. 2 depicts a cross sectional view of a portion of a sensor array, wherein a strain member of the array is not shown in section.

FIG. 2 depicts a cross sectional view of a portion of a sensor array 20. Strain member 24 of the sensor array 20 may provide strength to the array. The strain member 24 may be a multi-layer strength member having high tensile strength and minimal diameter and weight. In certain embodiments, the strain member 24 may include a number of discrete wiring channels for transmission of signals from sensors within the array to internal or external instrumentation. In other embodiments, wiring for the sensors may be carried in a separate cable. The strain member 24 may be, but is not limited to, steel cable, or cable formed of a high-strength polymers such as KEVLAR, ZYLON or VECTRAN. Strain members 24 may be supplied from a number of manufacturers, such as the Cortland Cable Company (Cortland, N.Y.). An outer surface of the strain member may adhere or bond to potting material 52 used to fill space between sensor sections 26 and the strain member. The outer jacket of the strain member 24 may also bind to the material used to form buoyancy sections 28. Typically, a sensor array 20 may be formed with a single strain member 24, but in some embodiments, two or more strain members may be utilized in an array.

A sensor section 26 of a sensor array 20 may include sensor 54, and body 56. The sensor 54 within a sensor section 26 may be any type of sensor or instrument needed at a particular location within the sensor array 20. For example, the sensor 54 may be a hydrophone. In an embodiment, the hydrophone may include a piezoelectric element that generates an electrical response when subjected to deformation by an acoustic signal. Several sensors may be electrically coupled together to form an active section of the array. In an alternate embodiment, the hydrophone may be a digital sensor formed from a fiber optic cable. The sensor sections 26 may also include other types of sensors and instruments such as, but not limited to, amplifiers, telemetry modules, depth indicators, accelerometers, geophones, or other sensors. In some sensor array embodiments, a depth indicator is formed as a portion of an end connector of the array 20.

Figure 4:
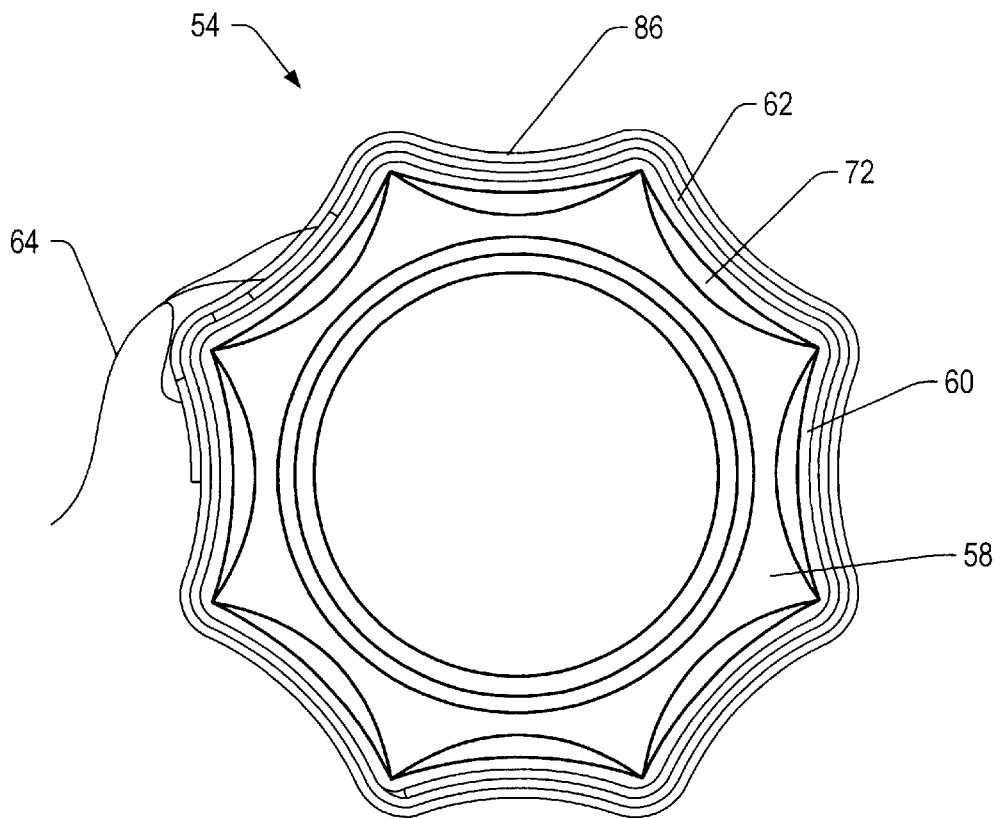
FIG. 4 depicts an end view of an embodiment of a diaphragm positioned over an embodiment of a base.
Figure 5:
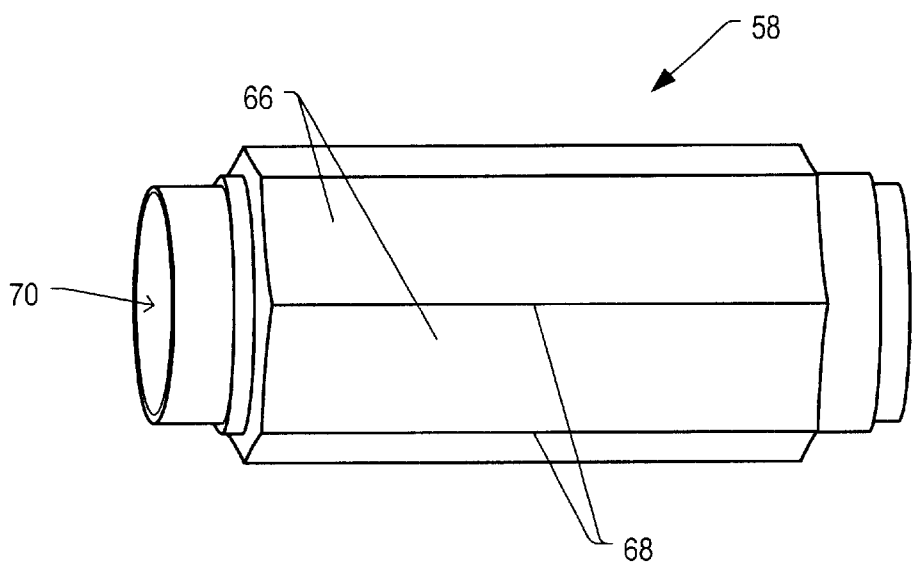
FIG. 5 depicts a perspective view of an embodiment of a base for a sensor.

A sensor 54 of a sensor section 26 may be a hydrophone. FIG. 4 depicts an end view of an embodiment of a hydrophone. The hydrophone may include base 58, diaphragm 60, piezoelectric film 62 and wiring 64. FIG. 5 depicts an embodiment of a base 58. The base 58 may include one or more concave or recessed surfaces 66 defined by ridges 68. In an embodiment, there are eight (8) concave surfaces 66. In alternate embodiments, a base 58 may have fewer or more concave surfaces 66. A maximum depth of the concave surfaces 66 may be sufficiently large to allow movement of the diaphragm and piezoelectric film of the sensor into the concave surfaces when an acoustic signal deflects the diaphragm. The maximum depth may be sufficiently small to inhibit deformation of the piezoelectric film beyond a yield limit of the piezoelectric film when the diaphragm and piezoelectric film are fully deformed within one or more of the concave surfaces 66. Inhibiting deformation of the film beyond the yield point may inhibit damage to sensors of the sensor array due to large acoustic signals. Inhibiting the deformation of the film beyond the yield point may allow the array to be submerged to any depth without the submersion depth causing damage to the sensors of the array.

A base 58 may be formed as a single piece by injection molding, or by reaction injection molding (RIM). A RIM system that produces sensor sections and buoyancy sections may be used to produce bases when an appropriate mold is placed within a molding machine of the RIM system. Alternately, the base 58 may include a plastic or metal first portion with a raised portion formed or positioned on the base. The raised portion may include one or more concave surfaces 66. The first portion may have cylindrical or other geometry. The base 58 may include passageway 70. A strain member may be positioned through the passageway 70 during assembly of an acoustic sensor array.

Figure 6:
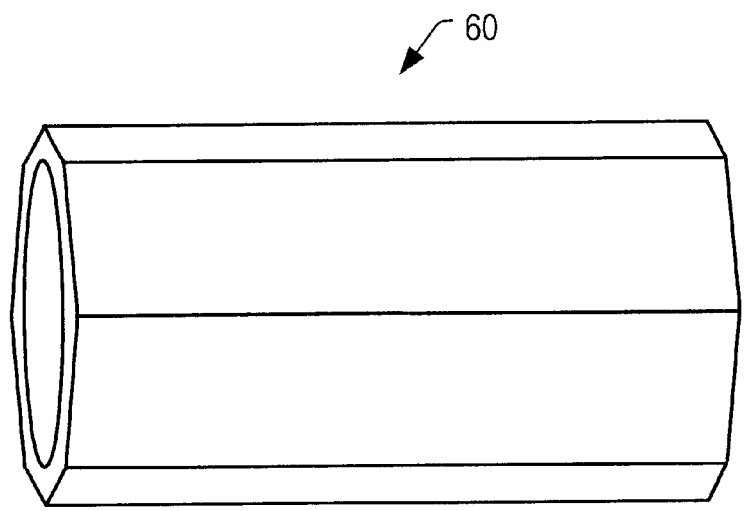
FIG. 6 depicts a perspective view of an embodiment of a diaphragm for a sensor.
Figure 7:
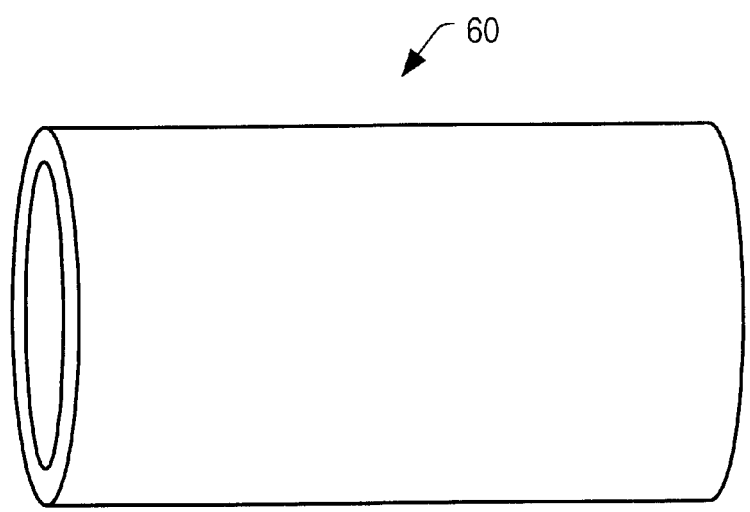
FIG. 7 depicts a perspective view of an embodiment of a tubular diaphragm.

FIG. 6 and FIG. 7 depict sensor diaphragm embodiments. A diaphragm 60 of a sensor may slide over a base of the sensor. The diaphragm 60 may be made of a flexible material. Portions of an inner surface of the diaphragm 60 may reside on ridges of a base. In the embodiment depicted in FIG. 6, the diaphragm 60 has substantially the same cross sectional shape as a raised outer surface of the base, although curvature of concave surfaces of the diaphragm are different than curvature of concave surfaces of the base to allow formation of air gaps 72 (depicted in FIG. 4) between the diaphragm and base. FIG. 4 depicts an end view of a base 58 and diaphragm 60 wherein the diaphragm has substantially the same cross sectional shape as the base. In an embodiment, the diaphragm 60 may include an end surface that contacts an end surface of ridges of the base 58. Insertion of the diaphragm 60 over the base 58 may be limited by the diaphragm end surface contacting the base ridges end surface. In an alternate embodiment, a diaphragm does not include an end surface. When the diaphragm 60 is positioned over the base 58, a sealant may seal the diaphragm to the base at each end of the diaphragm to inhibit axial movement of diaphragm relative to the base. Sealant at both ends of the diaphragm 60 may inhibit escape of air from air gaps 72 between the base 58 and the diaphragm during use.

In other diaphragm embodiments, the diaphragm may have a different cross sectional shape than a cross sectional shape of a base over which the diaphragm is to be placed. For example, the tubular diaphragm 60 depicted in FIG. 7 may slide over the octagonal base 58 depicted in FIG. 5. A sealant may be positioned at each end of the diaphragm to inhibit axial movement of diaphragm relative to the base. Sealant at both ends of the diaphragm may inhibit escape of air from air gaps 72 between the base 58 and the diaphragm 60.

As depicted in FIG. 4, a sensor 54 may have air gap 72 formed between an outer surface of a diaphragm 60 and a concave surface 66 of a base 58. When an acoustic signal passes through the sensor 54, the acoustic signal may deflect the diaphragm 60 into the gap 72. A piezoelectric film 62 that is wrapped around the diaphragm 60 may also be deflected into the gap 72. The piezoelectric film 62 may generate an electrical signal that is proportionate to the amount of deformation that the film is subjected to.

Piezoelectric film 62 may be wrapped around a diaphragm 60 of a sensor 54. The piezoelectric film 62 may be glued, taped, or otherwise fastened to the diaphragm 60 to inhibit the film from separating from the diaphragm. One adhesive that may be used to couple the film to the diaphragm is 3M-VHB (3M; St. Paul, Minn.). The film 62 may wrap one or more times around the diaphragm 60. In an embodiment, an adhesive may be placed on the back of the film and a peel-off covering may be placed over the adhesive. The adhesive and the covering may always be placed on a side of the film that will be biased with the same type of charge (positive or negative) when the film is deformed. Having the adhesive placed on the same side of a film allows each film of an array to be oriented so that all film surfaces of an array that face diaphragms will generate the same type of charge (either positive or negative) when the film is deformed. The covering may be removed as the film is wrapped around the diaphragm. A press or other instrument may be used to wind the film around the diaphragm to inhibit formation of gaps between layers of the film and to ensure that the film is pressed against an outer surface of the diaphragm. The piezoelectric film 62 may be a polyvinylidiene (PVDF) film. In alternate embodiments, other piezoelectric materials may be used in lieu of a PVDF film. Wrapping the film 62 more than one time around the diaphragm 60 may allow an acoustic signal that passes through the sensor 54 to deflect a large portion of the film. This may result in the generation of a clear, strong signal in response to the acoustic wave.

Figure 8:
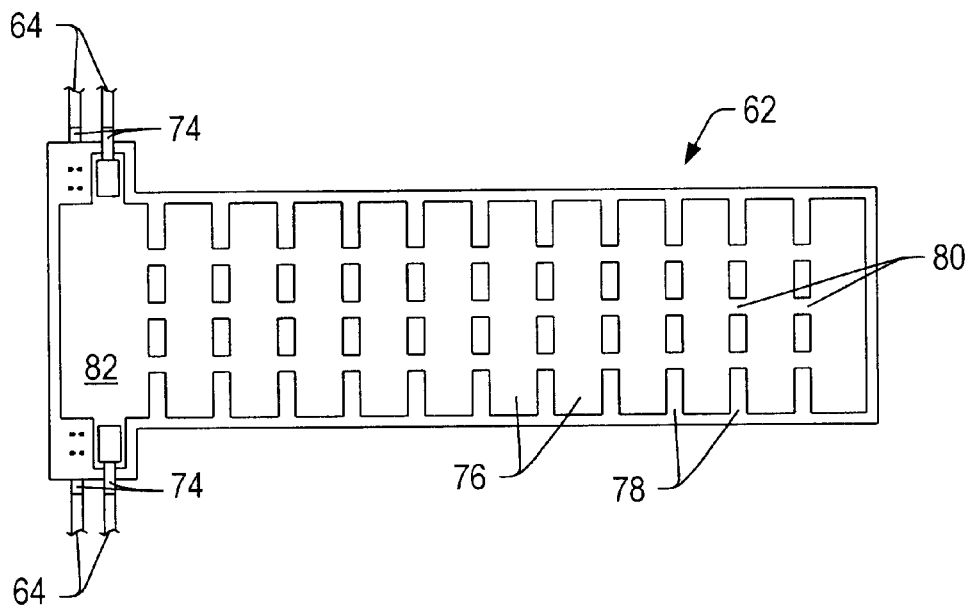
FIG. 8 depicts a front view of an embodiment of a piezoelectric film.
Figure 9:
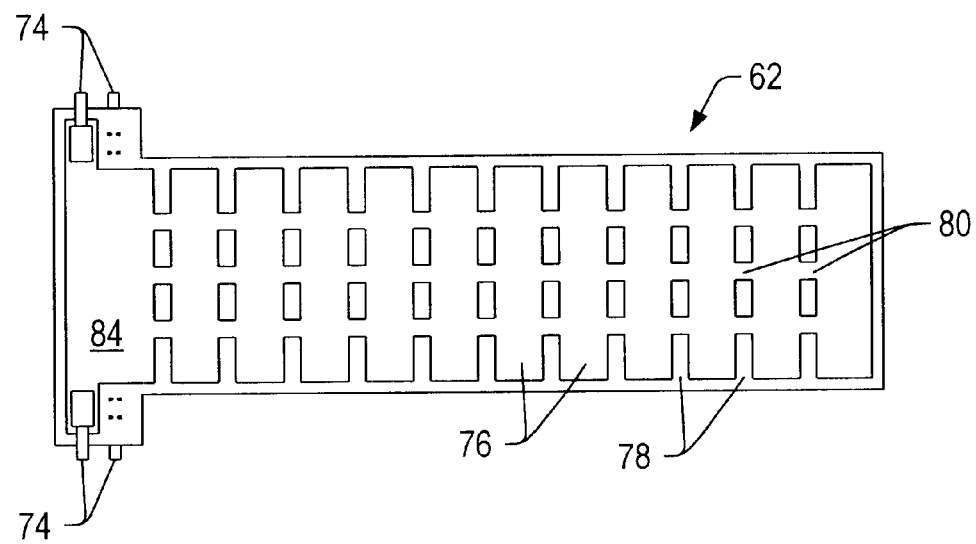
FIG. 9 depicts a back view of the embodiment of a piezoelectric film depicted in FIG. 8.

FIG. 8 and FIG. 9 depict front and back views of an embodiment of a piezoelectric film 62 that may be used in a sensor. Piezoelectric film 62 may have connector pins 74, and a conductive pattern on both faces of the film. The conductive pattern may be formed of a conductive metal layer deposited on the film. The metal may be, but is not limited to, gold, silver, copper, or aluminum. A conductive ink deposited on the film may be used to form the conductive pattern. The connector pins 74 allow wiring 64 to be attached to the piezoelectric film 62. The wiring 64 may be a twisted pair of electrical conductors. The wiring 64 may include a ground conductor. The twisted pair of conductors of the wiring 64 may be soldered to the pins 74 of the piezoelectric film 62.

A conductive pattern of a piezoelectric film 62 may include a number of conductive areas 76, a number of nonconductive strips 78, and a number of small conductive strips 80 that electrically connect the large conductive strips together. A desired pattern may be deposited on the piezoelectric film, or the pattern may be etched into a solid conductive layer placed on the film. The piezoelectric film 62 may be wrapped around a diaphragm and base of a sensor so that the nonconductive strips 78 are positioned above ridges of the base, and so that the conductive areas 76 are positioned above concave surfaces of the base. When the piezoelectric film 62 is deflected by an acoustic signal, the deflection of the film causes the generation of a positive charge at first film surface 82 and a negative charge at a second film surface 84. The charge generated by deflection of the film 62 may cause an electrical signal to flow through the conductive strips 76 and the small conductive strips 80 to the wiring 64. Placing the nonconductive strips 78 over the ridges of the base may reduce passive capacitance contributions from ridge supported areas of the piezoelectric film 62 that are not deformed by incident vibration.

Figure 10:
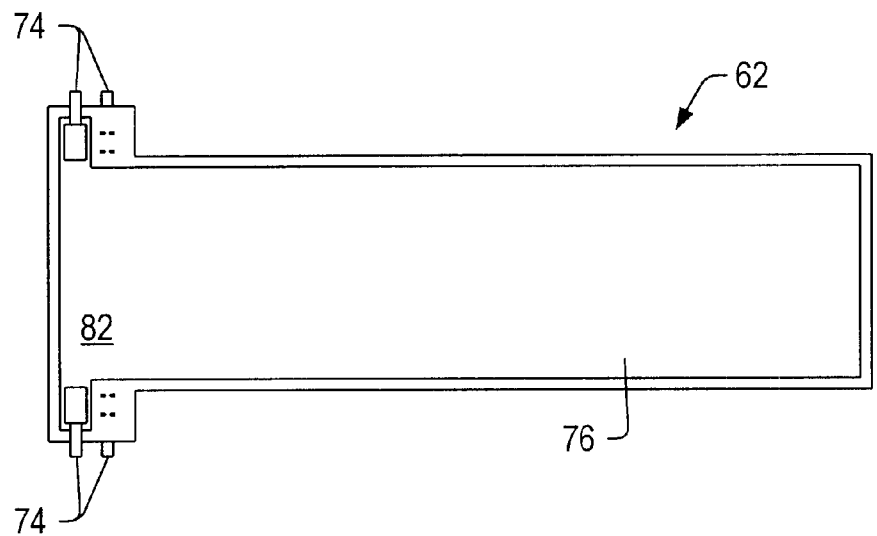
FIG. 10 depicts a front view of an embodiment of a piezoelectric film.

FIG. 10 depicts a front view of an alternate embodiment of a piezoelectric film 62 having a large conductive area 76 without nonconductive areas separating portions of conductive area. The back surface of the piezoelectric film 62 may also include a large conductive area without nonconductive areas separating portions of conductive area.

Figure 11:
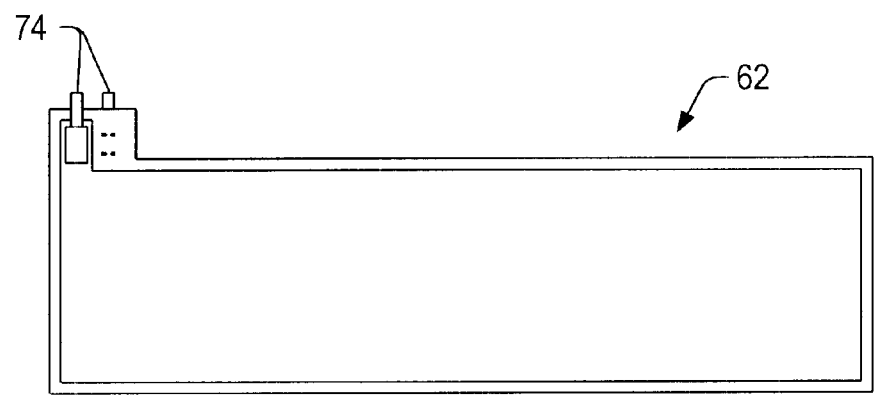
FIG. 11 depicts an embodiment of a piezoelectric film having two pins.

Pins 74 may be coupled to conductive areas of a piezoelectric film 62. A first side 82 of the piezoelectric film 62 may have conductive material adjacent to a pin 74, while an opposite surface does not include conductive material. Portions of the pin 74 may be pushed through the film 62 and bent over so that the pin is held to the film, and such that the pin is electrically coupled to the first side 82 of the film. A similar arrangement and connection may be made to electrically couple a different pin 74 to an opposite side of the film 62. In an embodiment of a piezoelectric film 62 illustrated in FIG. 8 and in FIG. 9, a pair of pins 74 extend from opposite sides of the film. The pins 74 allow wiring 64 to be electrically coupled across the piezoelectric film 62 to facilitate electrically coupling several sensors together. In an alternate embodiment of a piezoelectric film 62 illustrated in FIG. 11, the film may only have a pair of pins 74 extending from one side of the film. Jumper wires that pass across the film, or wiring that is placed through a passage in a base of the sensor, may facilitate coupling several such sensors together.

Figure 12:
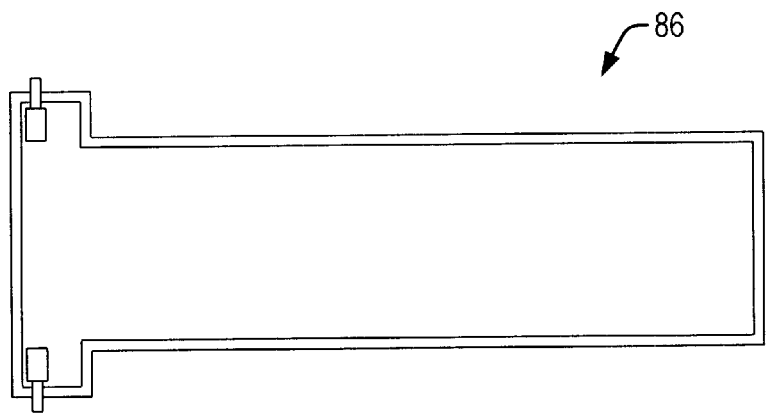
FIG. 12 depicts a front view of an embodiment of a shield for a sensor.

FIG. 12 depicts an embodiment of an optional shield 86 for a sensor. The shield 86 may be substantially the same size and shape as a piezoelectric film for the sensor. Pins 74 of the shield 86 may be coupled to a ground conductor of wiring for a sensor. The ground conductor may be coupled to a ground potential to minimize influence of external voltage sources on the response of sensors of an array. The shield 86 may include a substantially nonconductive base material, such as a polyester, with a metal layer deposited on top of the base. In an embodiment, the base material is polyester film such as MYLAR, though other types of material may also be used. The metal may be any type of conductor, such as, but not limited to, gold, silver, copper, or aluminum. The embodiment of a sensor shown in FIG. 4 includes a shield 86 over piezoelectric film 62.

Several piezoelectric films of an array may be electrically coupled together in parallel and/or series configurations to create active sections of the array. An active section may be spliced to an electrical channel of the array. The electrical channel may be wiring in a strain member cable, or the electrical channel may be a channel of a separate signal carrier. A strain member cable may have many channels. For example, a cable may have 12 channels. Cables having fewer or more channels may also be used. The channels of an array may be coupled to an external recording device and/or data processor when the array is in use. During production of the array, a splice into a channel may be made for each sensor. In an alternate embodiment, several sensors are electrically coupled together, and a splice into a channel is made for the coupled together sensors. In an embodiment, all sensors of an active section are coupled together and one splice into a channel is made for each active section. This type of arrangement may minimize the number of splices required to form the array. Signal amplifiers may be coupled to the sensors at selected locations in an array. The signal amplifiers may be placed in sensor sections and/or buoyancy sections of the array.

Figure 18:
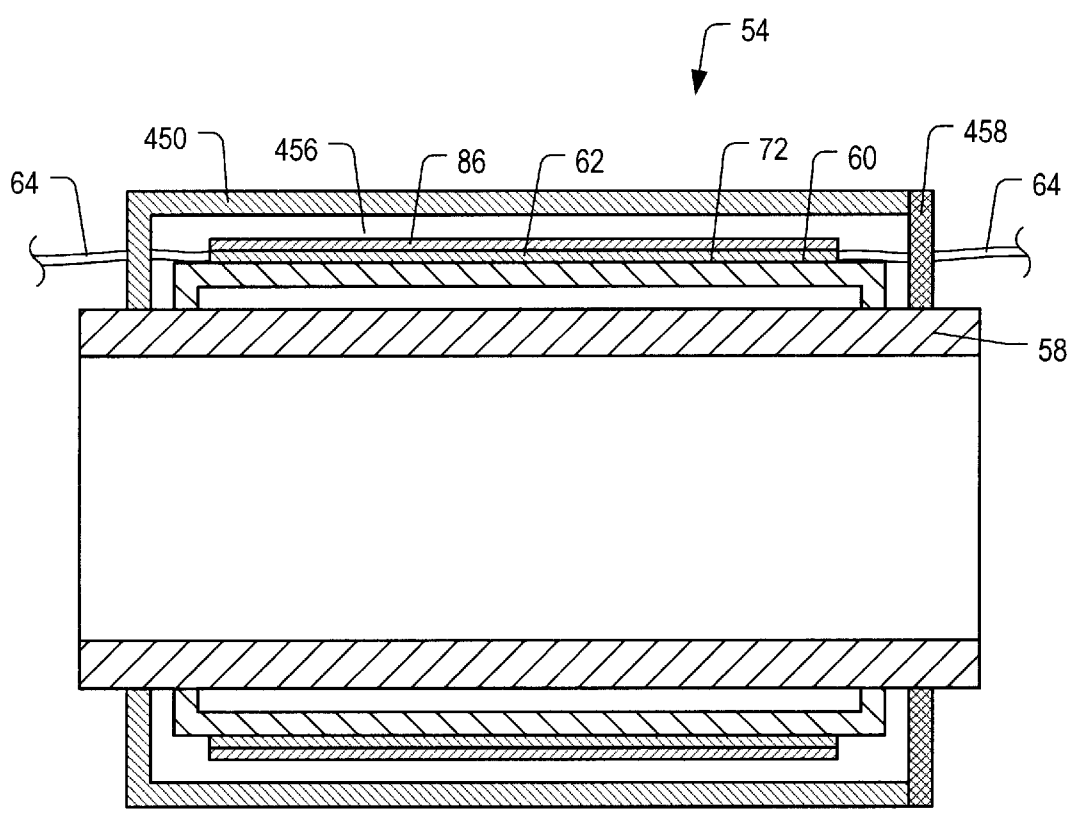
FIG. 18 illustrates a cross sectional view of an alternate embodiment of a sensor.

FIG. 18 illustrates a cross sectional view of an alternate embodiment of a sensor 54. Base 58, diaphragm 60, and piezoelectric film 62 may be configured as described in any of the embodiments herein. Cup 450 may be disposed around the sensor 54. A first end of the cup 450 may have a surface with an inner diameter substantially similar to an outer diameter of the first portion of base 58 so that the first end of the cup substantially encloses the diaphragm 60 and the raised portion of the base. A sealant may seal the cup 450 to the base 58 to fix a position of the cup on the base. Cup 450 may have an inner diameter larger than a maximum diameter of the diaphragm such that a relatively small air space is formed between the cup and the diaphragm. A filling material 456 may be injected through a second end of the cup 450 and into the air space between the cup and the diaphragm. The filling material may be any fluid that may possess substantially similar properties to a fluid. For example, the filling material may include shore A-00 polyurethane. An end cap 458 may be placed at the second end of the cup 450 to enclose the filling material in the cup. A sealant may seal the end cap to the cup. Use of the fluid-like filling material may reduce coupling between the sensor and shear energies present at a flow boundary on an external surface of a sensor body or array. This may substantially reduce noise in the sensor and increase a sensitivity of the sensor.

Cup 450 may include longitudinal fibers disposed in an adhesive matrix. The longitudinal fibers may be carbon fibers. The adhesive matrix may include epoxy or any other suitable adhesive resin that may bond to the longitudinal fibers. Cup 450 may be formed by any method that may bond the longitudinal fibers into the adhesive matrix. For example, cup 450 may be formed by a hand lay-up method. The hand lay-up method may include placing a hand of woven sheets of fiber upon a male mandrel. The adhesive material may be introduced to the woven sheets of fiber at a high temperature and high pressure and allowed to cure. In some embodiments, filament winding may be used to form cup 450. In filament winding, fiber may be machine wound helically around a mandrel. The adhesive material may then be introduced to the fibers and the matrix cured at high temperature and pressure. Longitudinal fibers that may have good longitudinal strength but may have relatively little axial strength may be formed using a pulltrusion method. Fiber filaments may be fed into an extruding machine die and drawn through. This may result in the fibers being embedded into a matrix in a substantially longitudinal direction. The matrix can then be cured at a relatively high temperature and pressure. A cup formed by the pulltrusion method may be deformed in the axial direction in response to acoustic wave pressures. The longitudinal strength of the cup may inhibit deformation of the cup in the longitudinal, or non-axial, direction. This may substantially decouple the sensor from rendering a response to longitudinal or shear forces imparted to the sensor or array.

A sensor 54 may be encapsulated within a body 56. FIG. 2 shows a sensor 54 encapsulated within a body 56. The body 56 may be formed by injection molding, reaction injection molding, or any other suitable process. The body 56 may include a passage through the body defined by surface 88, and ends 90. A strain member 24 and/or wiring may be positioned through the passage during production of a sensor array 20. The sensor 54 may be positioned at a desired location along a length of the strain member 24. Space between the surface 88 and the strain member and/or wiring may be substantially filled with potting material 52 to seal the passage and to fix the location of the sensor section.

Ends 90 of the body 56 may have large surface areas. Large end surface areas may provide a large binding surface for joining sensor sections to buoyancy sections 28.

Figure 13:
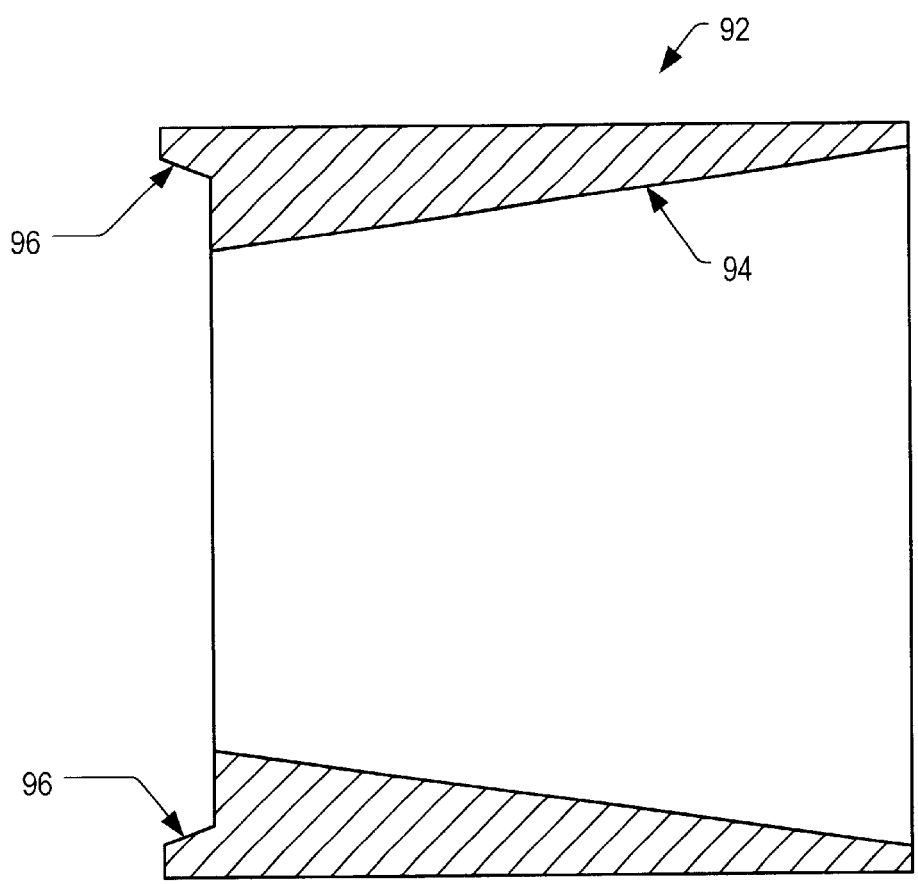
FIG. 13 depicts a cross sectional view of an embodiment of a sleeve used during formation of a sensor section.

FIG. 13 depicts a cross sectional view of an embodiment of a sleeve 92 that may be used to form ends of a body of a sensor section during encapsulation of a sensor. Inside surface 94 of the sleeve 92 may define an end surface of a sensor body. The sleeve may include an extension 96. The extension 96 may loosely mate to a recessed surface of a mandrel. The loose mating may allow folia to be inserted against the inside surface 94 of the sleeve 92. The folia may promote formation of a bond between an end surface of a sensor section and a buoyancy section when a buoyancy section is formed on the sensor section. The folia may be a thin sheet of polymeric material, such as, but not limited to, polyurethane, polyester, or a combination thereof. For example, the folia may be a low temperature polyurethane/polyester blend by Deerfield Plastics Co. (South Deerfield, Mass.).

Figure 14:
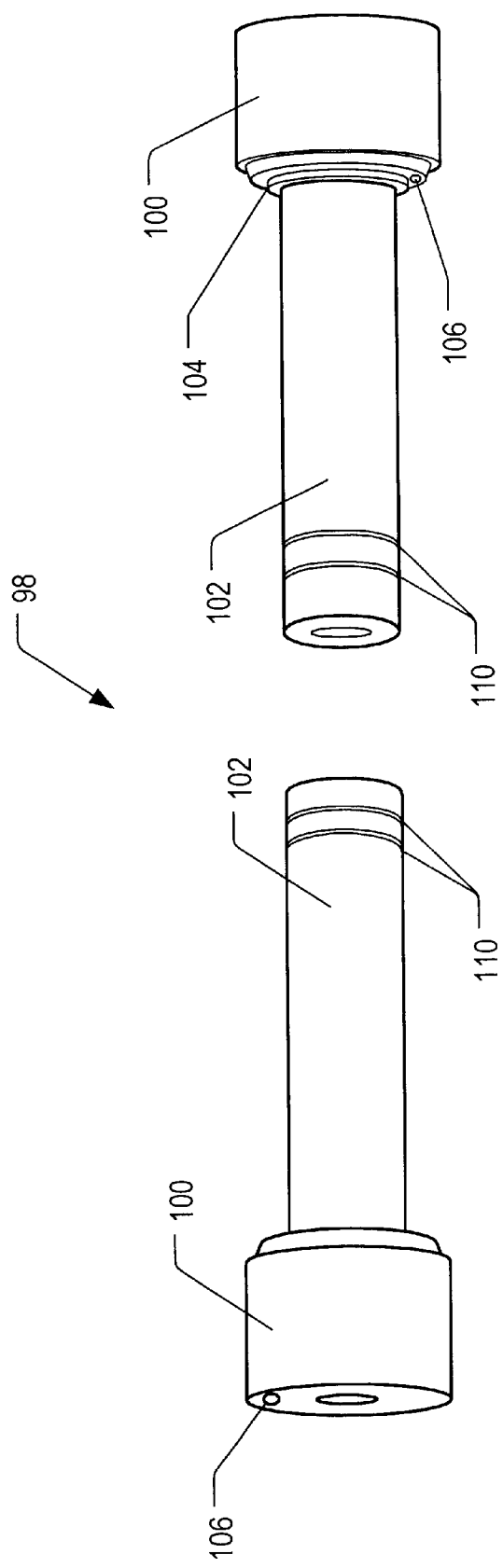
FIG. 14 depicts a perspective view of an embodiment of a mandrel used during formation of a sensor section having a single encapsulated sensor.

FIG. 14 depicts a perspective view of an embodiment of mandrel 98 that may be used with a sleeve, such as sleeve 92 depicted in FIG. 13. The mandrel 98 may include base 100, shaft 102, groove 104, and wire passage 106. A passage through the base 100 and shaft 102 may be formed to reduce the weight of the mandrel 98.

A base 100 of a mandrel 98 may be sized to fit within a channel in a mold of a molding machine. An outer surface of the base 100 may have the same circumferential (or perimeter) dimensions and shape as an outer surface of the sensor body to be formed. A surface of a sensor body that defines a longitudinal passage through the sensor body may be defined by a mandrel shaft 102 during molding of the sensor body. One end of the mandrel shaft 102 may be coupled to a base of a sensor. A sleeve, with a folia covered inner surface may be placed on the mandrel 98 so that an extension of the sleeve fits within groove 104 in the mandrel base 100. A base of a sensor may be positioned on an end of the mandrel shaft 102. The end of the shaft 102 may include indentations 110 that hold O-rings. O-rings positioned on the shaft 102 may contact the sensor base and inhibit injection of sensor body material into the base when the sensor body is formed. A small O-ring may be placed on the wiring of the sensor. The wiring may be wrapped around the shaft 102 of the mandrel 98. The wiring may exit the mandrel 98 through wiring passage 106. The O-ring on the wiring may reside in an O-ring recess in the wiring passage. The O-ring on the wiring may inhibit expulsion of sensor body material from the mold adjacent to the wiring when the sensor body is formed.

Figure 15:
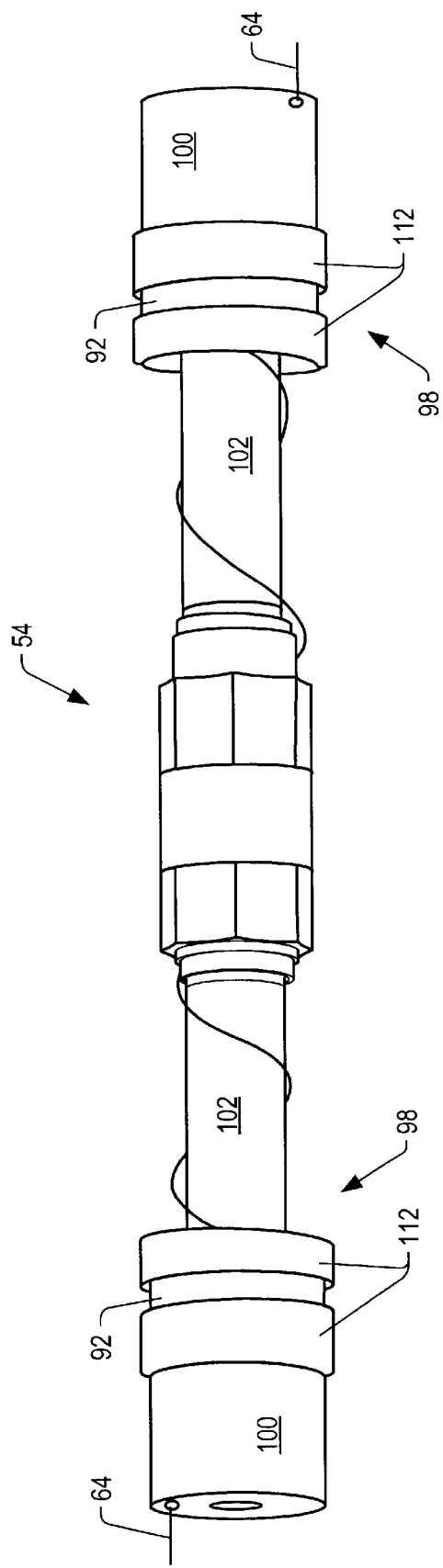
FIG. 15 depicts embodiments of mandrels and sleeves coupled to an embodiment of a sensor.

FIG. 15 depicts coupled together sensor 54, mandrels 98 and sleeves 92 prior to insertion of the combination in a mold for formation of a sensor body around the sensor. Portions of the mandrel base 100 and shaft 102 that will be exposed to sensor body material during formation of the sensor body may be coated with a mold release compound prior to the sleeves 92 and the sensor 54 being coupled to the mandrel 98. Folia 112 may be positioned against an inside surface of the sleeve 92 and folded over an outside surface of the sleeve before the sleeve is positioned on the mandrel 98. In some embodiments, folia may not be used. In such embodiments, an inside surface of the sleeve may be coated with a mold release compound. O-rings may be placed on indentations in the mandrel shaft. O-rings may also be placed on wiring 64 of the sensor 54. The O-rings on the wiring 64 may pass through wiring passages in the mandrels and the O-rings may be placed in O-ring recesses of the mandrels.

Joined together mandrels, sleeves and sensors may be placed in a mold to form a sensor section. The mold may be designed to form a single sensor section, or the mold may form multiple sensor bodies. A mold release compound may be placed on portions of the mold that will contact a sensor body or excess portions of folia when the sensor body is formed. In an embodiment, the mold is part of a RIM machine. After the sensor body is formed, excess portions of folia may be trimmed from the sensor body. Excess sensor body material may also be trimmed from the sensor body.

Figure 19:
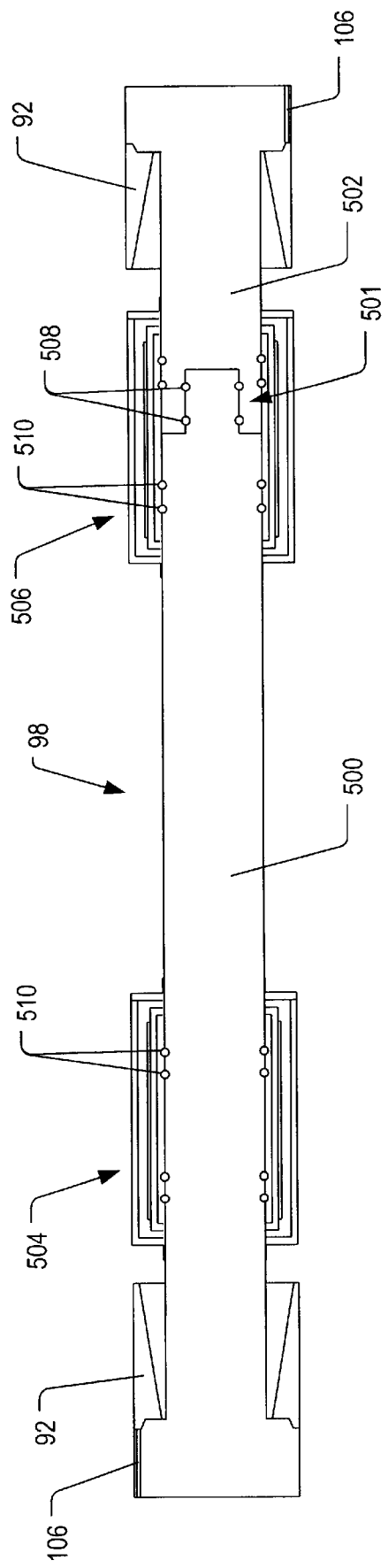
FIG. 19 illustrates a cross sectional view of more than one sensor supported on a mandrel.

In an embodiment, more than one sensor may be encapsulated in a sensor section. A mandrel may be modified such that more than one sensor may be supported by the mandrel. FIG. 19 illustrates a cross sectional view of an embodiment of more than one sensor supported on a mandrel 98. The mandrel may have a first piece 500 and a second piece 502. First piece 500 and second piece 502 may be separated at junction 501 so that a first sensor 504 may be disposed on first piece 500. A second sensor 506 may also be disposed on first piece 500. First piece 500 and second piece 502 may be recoupled at junction 501 and second sensor placed proximate junction 501 as shown in FIG. 19. At junction 501, first piece 500 may have one end of reduced diameter so that the end may relatively securely be placed in a similarly reduced diameter opening in an end of second piece 502. O-rings 508 may be disposed around the reduced diameter end of first piece 500.

O-rings 510 may secure a position of first sensor 504 and second sensor 506 on the first and second pieces of the mandrel as shown in FIG. 19. O-rings 510 may also inhibit injection of molding material into an interior of sensor 504 or sensor 506. Sleeves 92 may be placed on the mandrel. The sleeves may be configured as described in the embodiment of FIG. 13. Folia may be positioned against an inside surface of sleeves 92 as described in above embodiments. Wiring from sensors 504 and 506 may be wrapped around a shaft of the mandrel and may exit through wire passages as depicted in FIG. 14.

Sensors 504 and 506, mandrel pieces 500 and 502, and sleeves 92 may be placed in a mold. The mold may be configured as described in any of the embodiments herein. In some embodiments, the mold may be part of a RIM machine. Sensor 504 and sensor 506 may be encapsulated in a sensor body to form a sensor section. Excess portions of folia and sensor body material may be trimmed from the sensor body. The mandrel may also be modified so that three or more sensors may be encapsulated in one sensor section.

After a sensor is encapsulated in a sensor body to form a sensor section, the sensor may be tested in a test machine to ensure that the sensor section produces a desired response to acoustic energy. The test machine may include a housing that surrounds the sensor body, a speaker that generates acoustic waves, and an oscilloscope that connects to wiring of the sensor section. Sensor sections may also be tested with a similar testing machine after the sensor sections are wired together and coupled to a wiring channel of the array, but prior to fixing the position of the sensor sections on a strain member. This check allows the entire array to be tested for wiring errors prior to fixing the sensor sections to the strain member with potting material and prior to formation of the buoyancy sections.

A sensor array embodiment may be formed using a number of long benches that support the entire length of an unformed array. An unformed array includes end connectors, sensor sections and the strain member without buoyancy sections. The long benches may be adjacent to or movable to a molding machine of a RIM system. An end of a strain member may be placed through passages of sensor sections as, or after, the strain member is placed on the long benches. A first end connector may be coupled to a first end of the strain member. The sensor sections may be placed at desired positions along a length of the strain member. Wiring of each sensor section may be wrapped around the strain member and electrically coupled to other sensor sections, to amplifiers, and/or to a wiring channel of the strain member. The wiring may be wrapped around the strain member in the same direction (clockwise or counterclockwise) as the wiring is wound within the sensor body 56. Wrapping wiring around a strain member and within a sensor body may provide strain relief for the wiring that inhibits stresses from developing within the wiring that will break electrical connections within the array when the array is bent. The array may bend when stored on a reel or during use.

A second end connector may be coupled to a second end of the strain member. The sensors of the array may be tested to ensure that all sensors and active sections of the array are working properly. A speaker box may be placed over a sensor. Noise generated by the speaker may be measured by instrumentation attached to an electrical connection at an end of the array. After testing, a plug may be placed at an end of sensor body. Potting material may be injected into a space between the sensor body and the strain member to fix the position of the sensor section and fill the space between the strain member and the sensor body. The potting material may be polyurethane. The polyurethane may include a buoyancy modifier or other filler, such as hollow microspheres. After the potting material has set, the plug may be removed and used with other sensor sections during injection of potting material.

An end connector nearest to a RIM machine of a RIM system may be attached to a cable. The cable may pass through the molding machine to a reel. The cable may be used to pull the strain member into the mold until the end connector is located at a first end of the mold and a sensor body plugs the mold at a second end of the mold. The position of the remaining length of unformed array may be adjusted on the long benches as the first end of the unformed array is pulled into the mold. The mold may be closed, and the RIM system may be cycled to form a buoyancy section or sections. The mold may be opened and the cable may be used to draw the strain member forward until the next portion of unformed array is positioned at a first end of the mold. Excess mold material may be trimmed from the newly formed section of the array removed from the mold. When a sufficient length of array with buoyancy sections is formed to allow the cable to be attached to the reel, the cable may be attached to the reel, and formed portions of the array may be wound on the reel to advance and position unformed portions of the array in the molding machine. Trimming excess portions of mold material from formed portions of the array, advancing unformed portions of the array into the mold, closing the mold, cycling the RIM system, and opening the mold may be repeated until all buoyancy sections of the mold are formed. When forming the last section of the array, the second end connector may be positioned at the second end of the mold.

Buoyant sections 28 of an array 20 may be formed between adjacent sensor sections 26. Certain instruments and/or sensors (such as signal amplifiers) may be positioned within buoyant sections when the buoyant sections are formed. A portion of the buoyant sections 28 may be formed of a material that provides buoyancy for the array. The amount of buoyancy in a specific section may be varied to accommodate variations in density along a length of the array 20. For example, more buoyancy may be provided adjacent to more dense sections where connectors and/or telemetry modules are located. In certain embodiments, hollow microspheres, or hollow glass spheres, may be introduced into material used to form portions of the buoyant sections. The concentration and/or sizes of spheres may be adjusted to control the overall buoyancy of the array. In an embodiment of a sensor array that is to be towed by a vessel, the array may have a substantially neutral buoyancy in the water through which the array will be towed.

Buoyant sections and sensor sections of an array may be formed so that cross sectional shapes of the buoyant sections and sensor sections are substantially the same. The cross sectional shape of the buoyant sections and the sensor sections may be circular, but other cross sectional shapes, such as, but not limited to, ovoid, elliptical, rectangular, hexagonal, or octagonal may also be used. The circumference or perimeter of the buoyant sections and the sensor sections may be substantially identical so that the sensor array has substantially the same outer dimension along a length of the array. In alternate embodiments, the buoyancy sections may have larger or smaller circumferences or perimeters than the sensor sections. In such embodiments, portions of the buoyancy sections may taper to the size of the circumference or perimeter of the sensor sections so that smooth transitions are formed between the buoyancy sections and the sensor sections.

Figure 16:
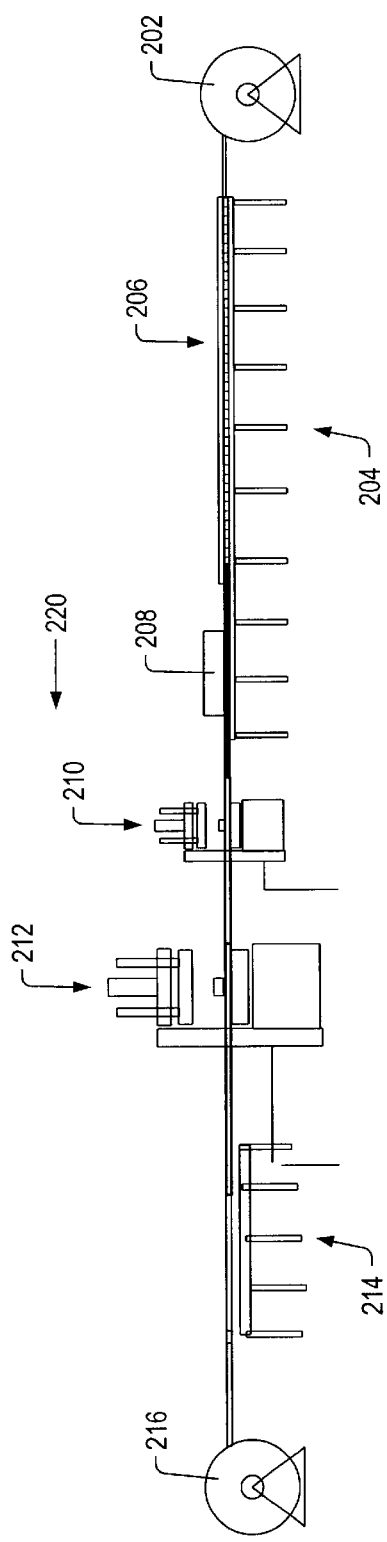
FIG. 16 depicts a representation of an alternate process for assembling an array.

FIG. 16 depicts a representation of an alternate process for forming an array. A strain member may be disposed on a first reel 202. A length of the strain member may be placed on bench 204. A first end of the strain member may be placed through passages of sensor bodies 206. The bench 204 may be of sufficient length to support a selected number of sensor bodies. The selected number of sensor bodies may be a number of sensor bodies needed to complete an array. The first end of the strain member may be placed through passages of each sensor body disposed on bench 204 such that each sensor body may be disposed on the strain member. A first end connector may be coupled to the first end of the strain member at electrical assembly area 208. Second reel 216 may be used to draw the strain member towards the second reel (from right to left as depicted by arrow 220 in FIG. 16) and through electrical assembly area 208, first RIM press 210, second RIM press 212, and trim area 214 by coupling a cable to the first end connector of the strain member. The second reel 216 may be electrically controlled. First reel 202 may have an electronic brake to apply tension to the strain member during an injection process.

As the strain member is drawn towards the second reel 216, a gate located at an end of bench 204 proximate electrical assembly area 208, may be used to determine a position of a sensor section on the strain member. The gate may be a mechanical gate that is opened to allow a sensor body to be drawn, along with the strain member, into electrical assembly area 208, or closed to inhibit a sensor body from being drawn into the electrical assembly area. Electrical connections between sensors, amplifiers, the strain member, and/or other electronic devices may be made in electrical assembly area 208. Electrical wiring between sensor bodies may be wrapped around the strain member as the strain member is drawn towards the second reel by rotating each sensor body in an appropriate direction (clockwise or counter-clockwise). As described in previous embodiments, the wiring may be wound around the strain member in the same direction as wiring within the sensor body.

A sensor body may be drawn through electrical assembly area 208 and into first RIM press 210. At first RIM press 210, molding material, such as polyurethane, may be injected into a space between the sensor body and the strain member. The molding material may or may not include hollow microspheres. This process may fix the position of the sensor section on the strain member and fill the space between the sensor body and the strain member as described in above embodiments. The strain member may be drawn further towards second reel 216 and a second sensor body may be drawn into the first RIM press 210 and injected with molding material. Additional sensor bodies may be drawn into the first RIM press 210 and each injected with molding material. When a location selected for termination of a sensor group is reached at electrical assembly area 208, connection between the sensor group and the strain member may be made at the electrical assembly area.

After a sufficient number of sensor sections have been molded at the first RIM press 210, the sensor sections may be drawn into second RIM press 212. At the second RIM press 212, more than one sensor section may be disposed in the RIM press to form buoyant sections, as described in any of the embodiments herein. The molded buoyant sections and sensor sections may be drawn into trim area 214 where excess molding may be trimmed from the sections. The sections may be trimmed by hand or with an automated trimming system. The trimmed and molded sections may be wound onto the second reel 216. The process may be repeated until the entire array and all sensor bodies have been molded. The second end connector may be coupled to a second end of the strain member. The entire array may be wound onto the second reel 216 and be transported to a quality control area for testing or to a user of the array. The alternate process described in the embodiment of FIG. 16 may be significantly more automated and require significantly less space than other processes. This may reduce costs related to, for example, capital investment, labor, climate control, and/or taxes.

Figure 17:
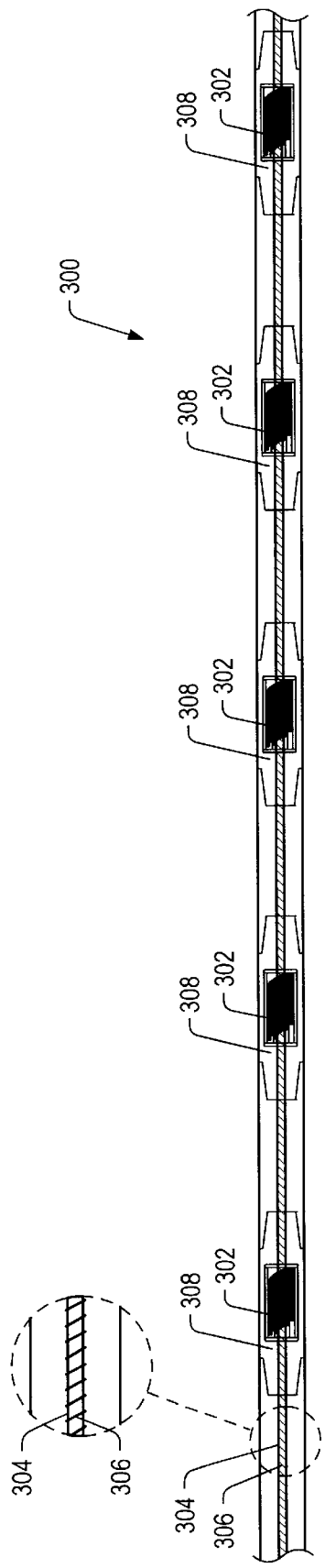
FIG. 17 depicts a cross sectional view of an embodiment of an array using fiber optic sensors.

FIG. 17 depicts a cross sectional view of an alternate embodiment of an array 300 using fiber optic sensors. Sensors 302 may be fiber optic sensors. Examples of fiber optic sensors are described in U.S. Pat. No. 5,317,544 to Maas et al. and U.S. Pat. No. 5,475,216 to Danver et al., which are incorporated by reference as if fully set forth herein. Sensors 302 may be coupled to each other using fiber optic cable 306. Fiber optic cable 306 may include both a sensing fiber and a reference fiber. Fiber optic cable 306 may include continuous fibers that couple the sensors 302 in series in the array 300. Up to about 2000 sensors may be coupled on a single fiber optic cable. An advantage is that no electrical connection is needed between sensors 302 and strain member 304. This may allow for simpler, faster construction of the array.

Sensors 302 may be encapsulated in a molding material to form sensor sections 308 using a RIM system as described in above embodiments. The sensors may be molded one after the other, in series, so that the fiber optic cable 306 coupling the sensors is not broken or damaged during the formation of the sensor sections. A mandrel, as described in the embodiment of FIG. 14, may be used to support the sensors during a molding process. However, a wire passage on the mandrel may have to be modified so that the fiber optic cable may be molded without having to disconnect the fiber optic cable or sensors. The sensor sections may be tested to ensure that the fiber optic cable and sensors produce desired responses to acoustic waves.

To form a fiber optic array, an end of strain member 304 may be placed through passages of sensors 302, or sensor sections 308, on a long bench or series of benches, as described in above embodiments. The strain member may be drawn through the passages so that the fiber optic cable coupling the sensors is not broken or damaged. In an embodiment, strain member 304 is a polymeric stress member such as an aramide stress member. Fiber optic cable 306 may be helically wound around strain member 304. The fiber optic cable may be wound in a direction identical to a winding of the fiber optic cable in the sensor 302 (clockwise or counter-clockwise). Winding the fiber optic cable around the strain member and in the direction of the winding in the sensor may allow for strain relief of the fiber optic cable. This may inhibit the cable from breaking during storage on a reel and/or use.

A position of sensors 302 on the strain member 304 may be fixed either by injecting a potting material in a space between the sensor and the strain member as described above or by injecting a molding material in the space using a RIM press as described above. The strain member and sensors may be drawn into a RIM system to form buoyant sections, as described in above embodiments. This may provide buoyancy and protection for a fiber optic array. End connections may be made to each end of the fiber optic cable as described in previous embodiments.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for constructing an acoustic sensor array, comprising:
   encapsulating at least one sensor in a molding material using reaction injection molding to form at least one sensor section;
   mounting at least the one sensor section on a length of a strain member; and
   encapsulating at least one portion of the strain member in a buoyant molding material to form at least one buoyant section adjacent to at least the one sensor section.

2. The method of claim 1, wherein the molding material comprises hollow microspheres.

3. The method of claim 1, wherein the molding material comprises polyurethane.

4. The method of claim 1, wherein encapsulating at least the one sensor in the molding material comprises using a molding machine.

5. The method of claim 1, further comprising rotating a molding machine about 90° during the reaction injection molding.

6. The method of claim 1, further comprising temporarily supporting at least the one sensor on a mandrel, wherein the mandrel is removed following encapsulating of at least the one sensor in the molding material.

7. The method of claim 6, further comprising disposing an o-ring on the mandrel such that molding material is inhibited from entering a passageway of at least the one sensor.

8. The method of claim 6, further comprising helically winding a wire attached to at least the one sensor around a length of the mandrel such that the molding material encloses the wire in a helical pattern.

9. The method of claim 6, further comprising threading a wire through a wiring passage in the mandrel such that the wire extends outside at least the one sensor section.

10. The method of claim 9, further comprising disposing an o-ring on the wire to substantially inhibit expulsion of the molding material through the wiring passage in the mandrel.

11. The method of claim 6, further comprising mating at least one sleeve to the mandrel.

12. The method of claim 11, further comprising inserting a folia against an inside surface of the at least one sleeve, wherein the folia promotes bonding between the molding material and the buoyant molding material.

13. The method of claim 1, further comprising coupling a wire attached to at least the one sensor to at least one additional sensor.

14. The method of claim 1, further comprising connecting a wire attached to at least the one sensor to at least one electrical device.

15. The method of claim 14, wherein at least the one electrical device comprises an amplifier.

16. The method of claim 14, wherein at least the one electrical device comprises a telemetry module.

17. The method of claim 14, wherein at least the one electrical device comprises a depth indicator.

18. The method of claim 14, wherein at least the one electrical device comprises an accelerometer.

19. The method of claim 1, further comprising disposing a potting material between at least the one sensor section and the strain member.

20. The method of claim 19, wherein the potting material bonds at least the one sensor section to the strain member.

21. The method of claim 19, wherein the potting material comprises polyurethane.

22. The method of claim 1, wherein encapsulating at least the one portion of the strain member adjacent to at least the one sensor section in the buoyant molding material comprises using a molding machine.

23. The method of claim 1, wherein encapsulating at least the one portion of the strain member adjacent to at least the one sensor section in the buoyant molding material comprises using a reaction injection molding process.

24. The method of claim 23, further comprising rotating a molding machine about 90° during the reaction injection molding process.

25. The method of claim 1, wherein the buoyant molding material comprises hollow micro spheres.

26. The method of claim 1, wherein the buoyant molding material comprises polyurethane.

27. The method of claim 1, further comprising substantially bonding the buoyant molding material to the molding material.

28. The method of claim 1, further comprising substantially bonding the buoyant molding material to the molding material such that fluid is inhibited from entering the array.

29. The method of claim 1, wherein the buoyant molding material comprises hollow microspheres, the method further comprising adjusting a concentration of the hollow microspheres in the buoyant molding material such that buoyancy of the array is controlled by the concentration of the hollow microspheres.

30. The method of claim 29, further comprising adjusting the concentration of the hollow microspheres such that buoyancy of the array is substantially uniform along its length.

31. The method of claim 29, further comprising increasing the concentration of the hollow microspheres adjacent to a more dense section of the array such that the increased concentration provides additional buoyancy adjacent to the more dense section.

32. The method of claim 1, further comprising encapsulating more than one sensor in the molding material to form at least the one sensor section.

33. The method of claim 1, wherein at least the one sensor comprises a hydrophone.

34. The method of claim 1, wherein at least the one sensor comprises a molded base, the method further comprising disposing the molded base in a diaphragm.

35. The method of claim 34, wherein the diaphragm comprises one or more concave surfaces.

36. The method of claim 34, wherein the diaphragm comprises a tubular member.

37. The method of claim 34, further comprising forming at least one air gap between the molded base and the diaphragm.

38. The method of claim 34, wherein at least the one sensor comprises a piezoelectric film.

39. The method of claim 38, further comprising surrounding a portion of the diaphragm with the piezoelectric film.

40. The method of claim 38, further comprising fastening the piezoelectric film to the diaphragm.

41. The method of claim 38, wherein the piezoelectric film comprises polyvinylidiene.

42. The method of claim 38, wherein the piezoelectric film comprises a conductive pattern on a face of the film.

43. The method of claim 42, wherein the conductive pattern comprises at least one conductive area and at least one non-conductive strip, wherein at least the one conductive area is positioned above a concave surface of the molded base, and wherein at least the one non-conductive strip is positioned above a ridge of the molded base.

44. The method of claim 42, wherein the conductive pattern comprises at least one conductive area, and wherein at least the one conductive area couples to at least one pin disposed on an edge of the piezoelectric film.

45. The method of claim 44, further comprising coupling at least the one pin to at least one wire.

46. The method of claim 42, further comprising disposing at least the one sensor within a shield.

47. The method of claim 46, wherein the shield comprises a metal layer disposed on a polyester base material.

48. The method of claim 42, wherein at least the one sensor comprises a piezoelectric film, wherein the shield has a substantially similar size and shape as the piezoelectric film, and wherein the shield substantially surrounds a portion of the piezoelectric film.

49. The method of claim 1, further comprising disposing a cup around at least the one sensor.

50. The method of claim 49, wherein the cup comprises longitudinal fibers disposed in an adhesive matrix.

51. The method of claim 50, further comprising forming the cup by pulltruding the longitudinal fibers into the adhesive matrix.

52. The method of claim 49, further comprising disposing a filling material between the cup and at least the one sensor.

53. The method of claim 52, wherein the filling material comprises A-00 polyurethane.

54. The method of claim 49, further comprising sealing the filling material within the cup.

55. The method of claim 49, wherein the filling material is configured to reduce coupling between at least the one sensor and shear energies present at a flow boundary on the array.

56. The method of claim 1, wherein at least the one sensor comprises a fiber optic sensor.

57. The method of claim 1, further comprising coupling an end connector to the strain member.

58. The method of claim 57, wherein the end connector is encapsulated in the buoyant molding material.

59. The method of claim 1, wherein at least the one buoyant section has an outer diameter substantially similar to an outer diameter of at least the one sensor section.

60. The method of claim 1, wherein the array comprises a towed array.

61. A method for constructing an acoustic sensor array, comprising:
encapsulating at least one sensor in a molding material using reaction injection molding to form at least one sensor section;
mounting at least the one sensor section on a length of a strain member; and
encapsulating at least one portion of the strain member in a buoyant molding material to form at least one buoyant section adjacent to at least the one sensor section, wherein the buoyant molding material comprises hollow microspheres.

62. An acoustic sensor array, comprising:
a strain member having a length;
sensor sections being formed using reaction injection molding and positioned along the length of the strain member, wherein each sensor section comprises a sensor;
buoyant sections positioned along the length of the strain member; and
wherein the strain member, the sensor sections, and the buoyant sections are joined to form the array.

63. The array of claim 62, wherein at least one sensor comprises a hydrophone.

64. The array of claim 62, wherein at least one sensor comprises a molded base.

65. The array of claim 62, wherein at least one sensor comprises a molded base having a conduit, and wherein the strain member passes through the conduit in the molded base.

66. The array of claim 62, wherein at least one sensor comprises a molded base having a plurality of ridges along its length.

67. The array of claim 62, wherein at least one sensor comprises one or more concave surfaces.

68. The array of claim 62, wherein at least one sensor comprises a molded base and a diaphragm, and wherein the molded base is inserted into the diaphragm.

69. The array of claim 68, wherein the diaphragm comprises one or more concave surfaces.

70. The array of claim 68, wherein the diaphragm comprises a tubular member.

71. The array of claim 68, wherein at least one air gap is formed between the molded base and the diaphragm.

72. The array of claim 68, wherein an acoustic signal deflects the diaphragm towards the molded base during use.

73. The array of claim 68, wherein at least one sensor comprises a piezoelectric film.

74. The array of claim 73, wherein the piezoelectric film surrounds a portion of the diaphragm.

75. The array of claim 73, wherein the piezoelectric film comprises polyvinylidiene.

76. The array of claim 73, wherein the piezoelectric film comprises a conductive pattern on a surface of the film.

77. The array of claim 76, wherein the conductive pattern comprises at least one conductive area and at least one non-conductive strip, wherein at least the one conductive area is positioned above a concave surface of the molded base, and wherein at least the one non-conductive strip is positioned above a ridge of the molded base.

78. The array of claim 76, wherein the conductive pattern comprises at least one conductive area, and wherein at least the one conductive area couples to at least one pin disposed on an edge of the piezoelectric film.

79. The array of claim 78, further comprising a wire coupled to the at least one pin.

80. The array of claim 62, wherein at least one sensor in a sensor section comprises an electromagnetic shield.

81. The array of claim 80, wherein the shield is grounded.

82. The array of claim 80, wherein the shield comprises a metal layer disposed on a polyester base material.

83. The array of claim 62, further comprising a cup disposed around at least one sensor.

84. The array of claim 83, wherein the cup comprises longitudinal fibers disposed in an adhesive matrix.

85. The array of claim 84, wherein the cup is configured to inhibit deformation of at least one sensor in a direction of the longitudinal fibers during use.

86. The array of claim 83, further comprising a filling material disposed between the cup and at least one sensor.

87. The array of claim 86, wherein the filling material comprises A-00 polyurethane.

88. The array of claim 86, wherein the filling material is sealed within the cup.

89. The array of claim 86, wherein the filling material is configured to reduce coupling between at least one sensor and shear energies present at a flow boundary on the array during use.

90. The array of claim 62, wherein at least one sensor comprises a fiber optic sensor.

91. The array of claim 62, further comprising a potting material disposed between each sensor section and the strain member.

92. The array of claim 62, wherein the strain member, the sensor sections, and the buoyant sections are molded to form the array.

93. The array of claim 62, wherein the sensor sections comprise hollow microspheres.

94. The array of claim 62, wherein the sensor sections comprise a polyurethane material.

95. The array of claim 62, wherein the buoyant sections comprise a reaction injection molded material.

96. The array of claim 62, wherein the buoyant sections comprise hollow microspheres.

97. The array of claim 62, wherein the buoyant sections comprise a polyurethane material.

98. The array of claim 62, wherein each buoyant section is bonded to at least one sensor section and the strain member such that fluid is inhibited from entering the array during use.

99. The array of claim 62, wherein the buoyant sections have an outer diameter substantially similar to an outer diameter of the sensor sections.

100. The array of claim 62, wherein the array has a substantially constant outer diameter.

101. The array of claim 62, further comprising an amplifier disposed in at least one sensor section.

102. The array of claim 62, further comprising an amplifier disposed in at least one buoyant section.

103. The array of claim 62, further comprising a telemetry module disposed in at least one buoyant section.

104. The array of claim 62, further comprising a depth indicator disposed in at least one buoyant section.

105. The array of claim 62, wherein the buoyant sections comprise hollow microspheres, and wherein a concentration of the hollow microspheres in the buoyant sections is adjusted such that buoyancy of the array is controlled by the concentration of the hollow microspheres along the length of the strain member.

106. The array of claim 62, wherein the buoyant sections comprise hollow microspheres, and wherein a density of the hollow microspheres in the buoyant sections is adjusted such that buoyancy of the array is controlled by the density of the hollow microspheres along the length of the strain member during use.

107. The array of claim 62, wherein buoyancy of the array is substantially uniform along the length of the strain member during use.

108. The array of claim 62, wherein the buoyant sections comprise hollow microspheres, and wherein a concentration of the hollow microspheres is increased adjacent to a more dense section of the array such that the increased concentration of the hollow microspheres provides for additional buoyancy adjacent to the more dense section during use.

109. The array of claim 62, wherein the array comprises a towed array.

110. The array of claim 62, wherein the array is neutrally buoyant in fresh water.

111. An acoustic sensor array, comprising:

a strain member having a length;

sensor sections being formed using reaction injection molding and positioned along the length of the strain member, wherein each sensor section comprises a sensor;

buoyant sections positioned along the length of the strain member, wherein the buoyant sections comprise hollow microspheres; and wherein the strain member, the sensor sections, and buoyant sections are joined to form the array.

* * * * *